United States Patent
Baig et al.

(10) Patent No.: US 12,465,894 B2
(45) Date of Patent: Nov. 11, 2025

(54) METHOD FOR CLEANING A FOULED WATER PURIFICATION MEMBRANE

(71) Applicant: KING FAHD UNIVERSITY OF PETROLEUM AND MINERALS, Dhahran (SA)

(72) Inventors: Umair Baig, Dhahran (SA); Abdul Waheed, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/243,768

(22) Filed: Jun. 20, 2025

(65) Prior Publication Data

US 2025/0312753 A1   Oct. 9, 2025

Related U.S. Application Data

(63) Continuation of application No. 18/084,085, filed on Dec. 19, 2022, now Pat. No. 12,343,688.

(51) Int. Cl.
  *B01D 71/68* (2006.01)
  *B01D 71/02* (2006.01)
  *B01D 71/48* (2006.01)
  *B82Y 30/00* (2011.01)

(52) U.S. Cl.
  CPC .......... *B01D 71/68* (2013.01); *B01D 71/0211* (2022.08); *B01D 71/481* (2022.08); *B82Y 30/00* (2013.01)

(58) Field of Classification Search
  CPC .. B01D 71/68; B01D 71/0211; B01D 69/148; B01D 71/56
  See application file for complete search history.

(56) References Cited

U.S. PATENT DOCUMENTS

| | | |
|---|---|---|
| 11,426,343 B2 | 8/2022 | Chiatello et al. |
| 2014/0319044 A1 | 10/2014 | Giannelis et al. |
| 2023/0330644 A1* | 10/2023 | Faisal ............... C02F 1/30 |

FOREIGN PATENT DOCUMENTS

| | | | |
|---|---|---|---|
| CN | 103680996 B | 8/2017 | |
| CN | 111018041 A * | 4/2020 | |
| CN | 112156662 A * | 1/2021 | ......... B01D 67/0079 |

(Continued)

OTHER PUBLICATIONS

Balakumar, et al. ; Synergistic temary porous CN-PPy-MMt nanocomposite for efficient photocatalytic metronidazole mineralization performance, mechanism, and pasthways ; Environmental Science: Nano, Issue 8 ; 2021 ; Abstract Only ; 2 Pages.

(Continued)

*Primary Examiner* — Ryan B Huang
(74) *Attorney, Agent, or Firm* — Oblon, McClelland, Maier & Neustadt, L.L.P.

(57) ABSTRACT

A membrane including a polysulfone/polyethylene terephthalate (PSf/PET) support and an active layer on an outer surface of the PSf/PET support. The active layer comprises reacted units of a diacyl chloride compound, a tetra-amine compound, and a nanocomposite including graphitic carbon nitride and polypyrrole. The membrane of the present disclosure is self-cleaning following exposure to radiation and finds application in water decontamination and de-salination.

16 Claims, 31 Drawing Sheets

(56) References Cited

FOREIGN PATENT DOCUMENTS

| CN | 112495436 A | 3/2021 |
|---|---|---|
| CN | 112156662 B | 9/2021 |

OTHER PUBLICATIONS

Zhou, et al. ; Uniformly assembled polypyrrole-covered bacterial cellulose/g-C3N4 flexible nanofiber membrane for catalytic degradation of tetracycline hydrochloride ; Journal of Water Process Engineering, vol. 47 ; Jun. 2022 ; Abstract Only ; 2 Pages.

* cited by examiner

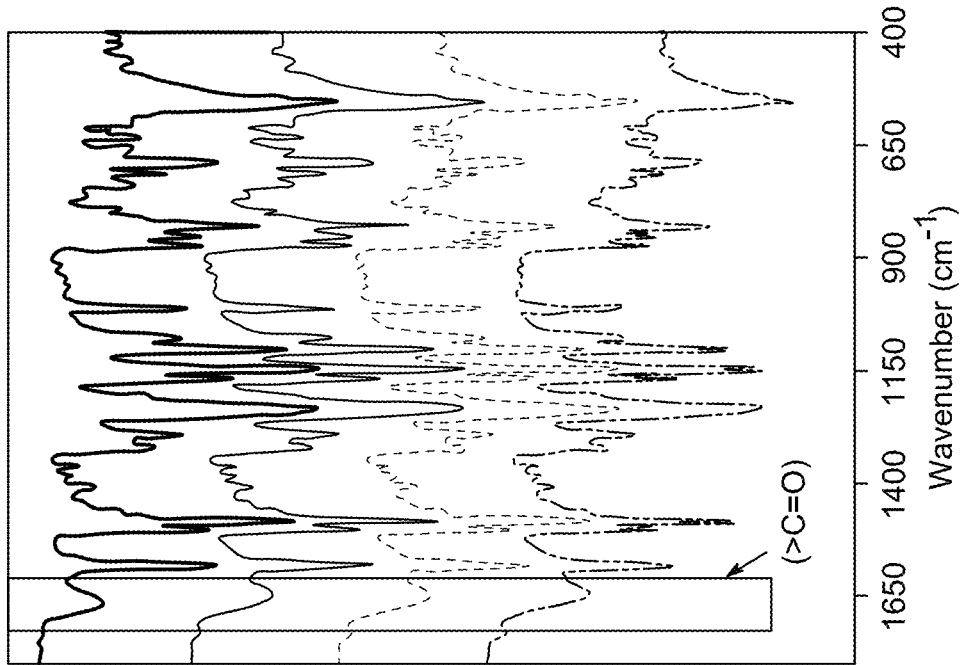
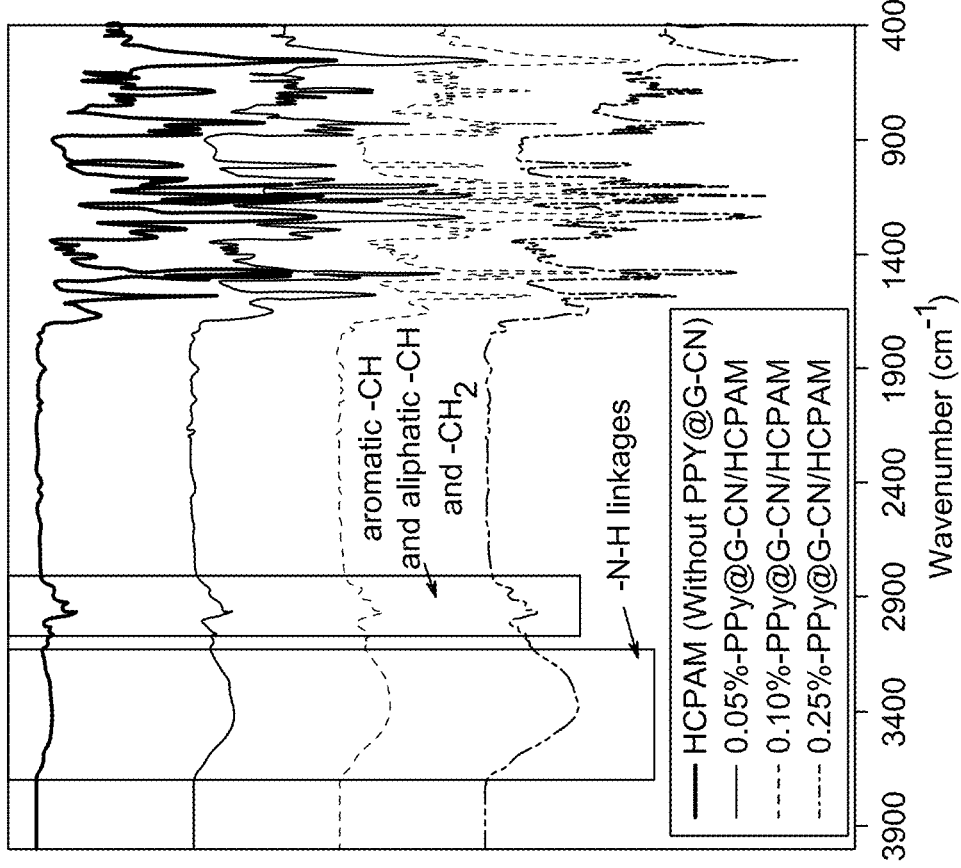
FIG. 6A
FIG. 6B

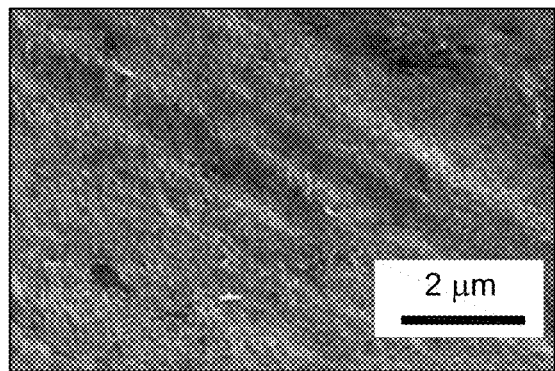 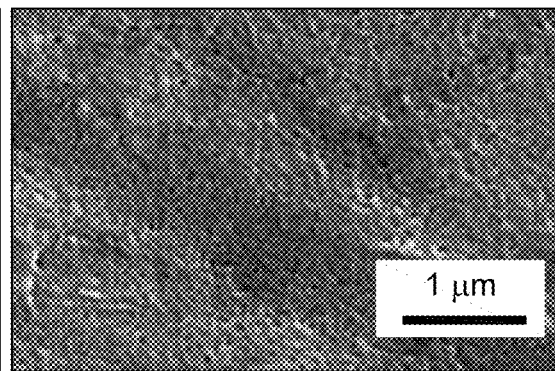
FIG. 9A    FIG. 9B
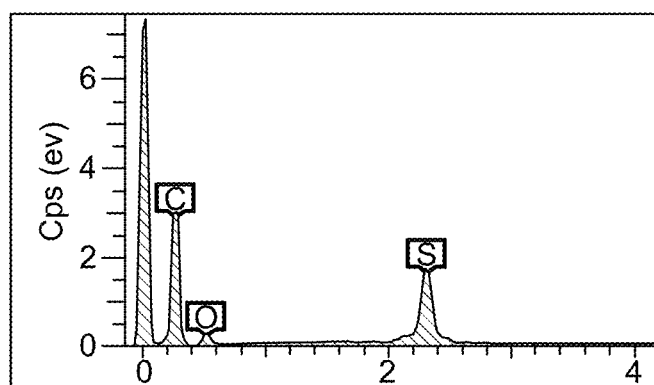
FIG. 9C
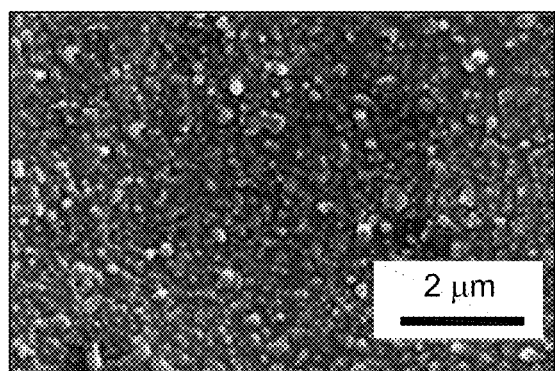 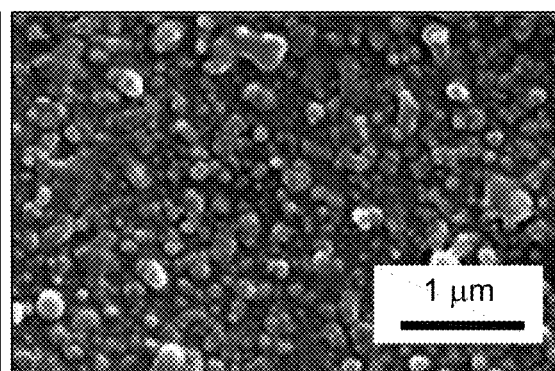
FIG. 9D    FIG. 9E

METHOD FOR CLEANING A FOULED WATER PURIFICATION MEMBRANE

CROSS-REFERENCE TO RELATED APPLICATIONS

The present application is a Continuation of U.S. application Ser. No. 18/084,085, now allowed, having a filing date of Dec. 19, 2022.

BACKGROUND

Technical Field

The present disclosure is directed to membranes and particularly relates to a photo-responsive membrane, including a nanocomposite of graphitic carbon nitride and polypyrrole, for water decontamination and desalination applications.

Description of Related Art

The "background" description herein generally presents the context of the disclosure. Work of the presently named inventors, to the extent it is described in this background section, as well as aspects of the description that may not otherwise qualify as prior art at the time of filing, are neither expressly nor impliedly admitted as prior art against the present invention.

As water is pivotal to the well-being of human society, the supply of clean water is in high demand for socio-economic development in the current age of rapid industrialization. However, due to increased industrialization, contamination of water by various organic and inorganic pollutants such as hazardous dyes, heavy metal ions, and different divalent and monovalent ions, has increased. Release of organic compounds used in manufacturing, toxic metals from tanning industries, and dyes from paint, textiles, and inks industries are common sources of water pollution. Hence, decontamination and desalting contaminated water are essential for clean water production.

Several techniques, such as adsorption, distillation, flocculation, coagulation, precipitation, biodegradation, and advanced oxidation processes, have been commonly used for wastewater treatment. However, membrane technology is green, less energy-intensive, and has a high potential for removing dyes and salts from contaminated water. With the potential of rejecting relatively low molecular weight (200-1,000 Da) organic pollutants and divalent ions, nanofiltration membranes (NFMs) have potential for advanced industrial saline wastewater treatment. However, NFMs suffer from fouling by foulants, including organic pollutants such as dyes. The foulants adsorb on the membrane surface through various interactions such as electrostatic interactions, hydrophobic interaction and hydrogen bonding, which affect the performance of the membrane. Such organic fouling is challenging to remove with simple rinsing and special treatments are required to eliminate such foulants from the membrane surface. Hence, various methodologies have been adopted for cleaning the membrane surface, but they suffer from certain drawbacks such as extended time for treatment, high energy, and solvent requirements.

Incorporating various inorganic photocatalytic nanomaterials, such as $TiO_2$, ZnO, and ZnS, in the membrane is an option for mitigating the fouling of the membrane through photocatalytic self-cleaning under light irradiation. However, many photocatalytic nanomaterials, especially $TiO_2$, need activation by high energy UV irradiation, which hampers the utilization of these materials in real-life applications.

Hence there still exists a need to develop a membrane that overcomes the limitations of the art. It is one object of the present disclosure to provide a nanofiltration membrane. It is another object to provide a self-cleaning nanofiltration membrane. It is another object to provide a self-cleaning nanofiltration membrane that is activated with visible light.

SUMMARY

In an exemplary embodiment, a membrane is disclosed. The membrane includes a polysulfone/polyethylene terephthalate (PSf/PET) support, and an active layer on an outer surface of the PSf/PET support. The active layer includes reacted units of a diacyl chloride compound, a tetra-amine compound, and a nanocomposite including graphitic carbon nitride and polypyrrole.

In some embodiments, the graphitic carbon nitride is bonded to at least one terminal end of the polypyrrole in the nanocomposite.

In some embodiments, the graphitic carbon nitride has triazine and heptazine rings.

In some embodiments, the graphitic carbon nitride is in the form of nanosheets.

In some embodiments, the nanosheets have a thickness of 10-100 nanometers (nm).

In some embodiments, the diacyl chloride compound is an aromatic ring substituted with two acyl chloride groups.

In some embodiments, the tetra-amine compound is a linear or branched aliphatic amine with of 2-50 carbons and four amine groups.

In some embodiments, the membrane has 0.01 to 5 weight percent (wt. %) of the nanocomposite based on the total weight of the active layer.

In some embodiments, the particles of the active layer have a globular shape.

In some embodiments, the particles of the active layer are not agglomerated.

In some embodiments, the particles of the active layer have an average size of 50-200 nm.

In some embodiments, the membrane has 50-70 atomic percent (at. %) carbon, 25-35 at. % sulfur, 5-15 at. % oxygen, and 1-10 at. % nitrogen, based on a total number of atoms in the membrane.

In some embodiments, the membrane has a surface roughness of less than 24 nm.

In some embodiments, the membrane has a water contact angle of less than 90°.

In some embodiments, the active layer covers at least 95% of the outer surface of the PSf/PET support.

In some embodiments, the membrane is porous, having pores with an average diameter of less than 1 nm.

In some embodiments, the membrane has a permeate flux of 40 to 100 liter per square meter per hour ($L\ m^{-2}\ h^{-1}$) at 10-30 bar.

In some embodiments, the membrane rejects at least 60% of inorganic salts.

In some embodiments, the membrane is self-cleaning following exposure to radiation.

In some embodiments, the radiation is from 400-700 nm.

The foregoing general description of the illustrative present disclosure and the following detailed description thereof are merely exemplary aspects of the teachings of this disclosure and are not restrictive.

BRIEF DESCRIPTION OF DRAWINGS

A complete appreciation of this disclosure and many of the attendant advantages thereof will be readily obtained as the same becomes better understood by reference to the following detailed description when considered in connection with the accompanying drawings, wherein:

FIG. 6A is a plot depicting the ATR-FTIR spectrum of pristine/bare membrane (HCPAM), and various PPy@G-CN/HCPAM membranes, each with different proportions of PPy in the PPy@G-CN composite, according to certain embodiments;

FIG. 6B depicts a fingerprint region of the ATR-FTIR spectrum in FIG. 6A including the pristine membrane, and various PPy@G-CN/HCPAM membranes, each with different proportions of PPy in the PPy@G-CN composite, according to certain embodiments;

FIGS. 9A and 9B depict field emission-scanning electron microscope (FESEM) images of the PSf/PET support, at two different magnifications, according to certain embodiments;

FIG. 9C depicts energy dispersive X-ray spectroscopy (EDX) analysis of the PSf/PET support, according to certain embodiments;

FIGS. 9D and 9E depict FESEM images of the pristine HCPAM membrane, at two different magnifications, according to certain embodiments;

DETAILED DESCRIPTION

Figure 1A:
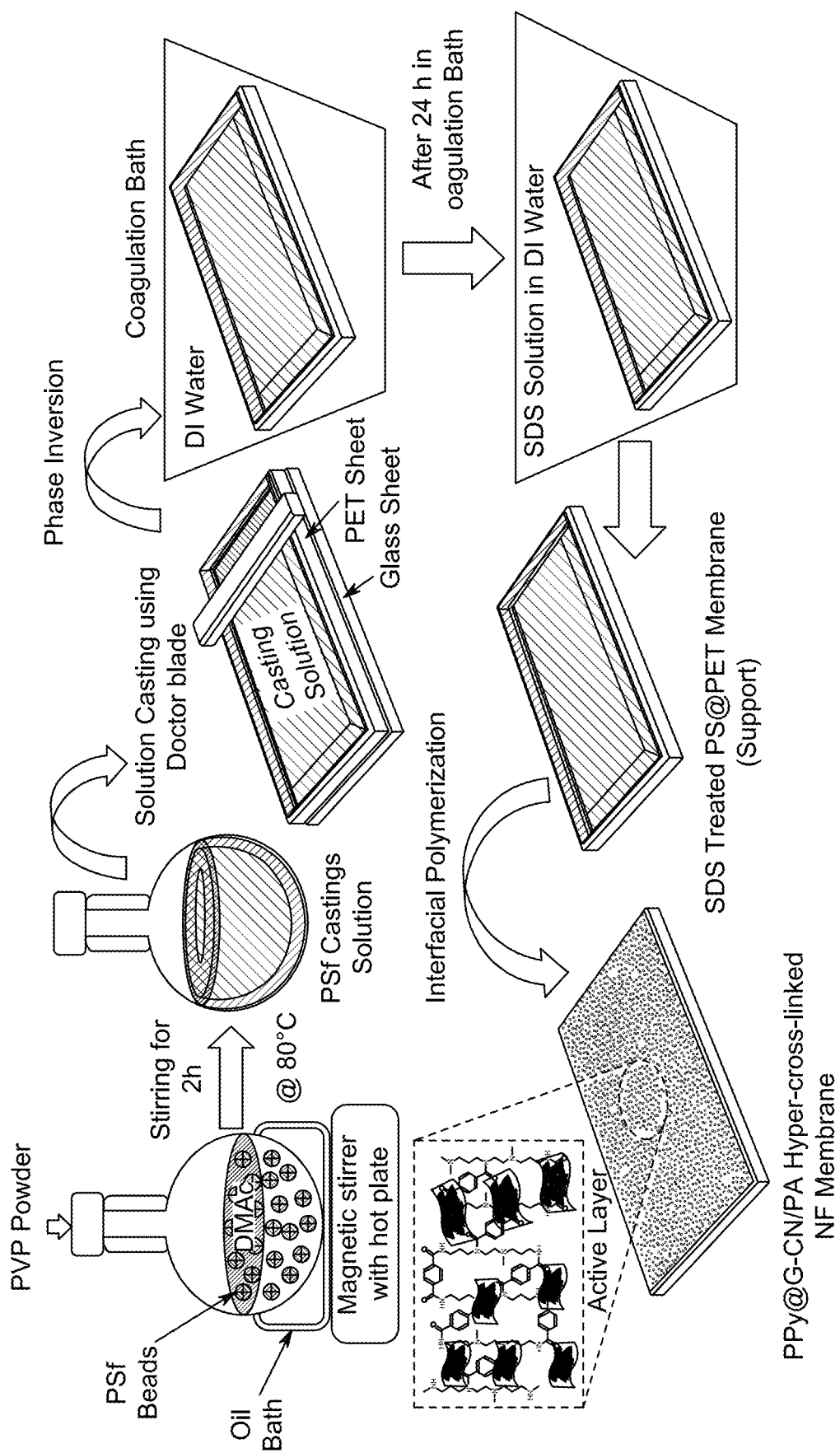
FIG. 1A is a schematic illustration depicting various phases of membrane fabrication, according to certain embodiments.

In the drawings, reference numerals designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

All ranges disclosed herein are inclusive of the endpoints, and the endpoints are independently combinable with each other, and inclusive of all intermediate values of the ranges. Thus, ranges articulated within this disclosure, e.g. numerics/values, shall include disclosure for possession purposes and claim purposes of the individual points within the range, sub-ranges, and combinations thereof.

According to an aspect of the present disclosure, a membrane is described. The membrane is fabricated by incorporating an active layer on a support. Generally, the support should possess good mechanical and thermal properties. The support can withstand temperatures from −100 to 200° C. preferably −50 to 150° C., or approximately 50° C. Also, the support has resistance to chemicals such as aromatic hydrocarbons, ketones, ethers, and esters. In some embodiments, the support may be formed of polymeric materials such as polysulfone (PSf), polyethersulfone (PES), polyethylene terephthalate (PET), or a combination thereof. In other embodiments, polymeric support materials such as poly (ether sulfone) (PSF), polyacrylonitrile (PAN), polypropylene (PP), polyvinylidene fluoride (PVDF), polytetrafluoroethylene (PTFE), polyimide (PI), and poly(arylene ether nitrile ketone) (PPENK), alone or in combination.

In a preferred embodiment, the support is formed of polysulfone/polyethylene terephthalate (PSf/PET). For this purpose, the PSf, and the PET ware mixed in various weight ratios to obtain the support with desired chemical, mechanical, and thermal properties. In some embodiments, a weight ratio of PSf to PET is 1:20, 1:15, 1:10, 1:5, 1:1, 20:1, 15:1, 10:1, or 5:1. Although the description herein refers to the use of PSf/PET support, it may be understood by a person skilled in the art, that other polymeric supports may be used as well, albeit with a few variations, as may be obvious to a person skilled in the art. The support may be prepared by any of the conventional methods known in the art, for example, a phase inversion method or an electrostatic spinning method. In a preferred embodiment, the PSf/PET support is prepared by a phase inversion method.

The membrane further includes an active layer on the outer surface of the PSf/PET support. The active layer includes a nanocomposite. The nanocomposite includes one or more materials that absorb light in the visible spectrum. In some embodiments, the active layer includes a nitrogen containing conductive polymer selected from the group consisting of polypyrrole, and polyaniline. In some embodiments, the nitrogen containing conductive polymer has an average molecular weight of 500 to 10,000 g/mol, preferably 1,000 to 9,000, 2,000 to 8,000, 3,000 to 7,000, or 4,000 to 5,000. In an embodiment, the polypyrrole is of the below Formula 1:

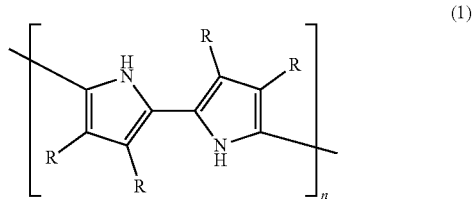

In Formula 1, R is a hydrogen, a straight or branched alkyl chain with 1 to 10 carbon atoms, or an aromatic substituent with 1 to 10 carbon atoms and n is 2 to 5,000.

In some embodiments, the nanocomposite includes a conductive carbon nanomaterial selected from the group consisting of graphene, graphitic carbon nitride, carbon nanotubes, fullerenes, or reduced graphene oxide. In a preferred embodiment, the conductive carbon nanomaterial is graphitic carbon nitride (G-CN). The G-CN has the empirical formula $C_3N_4$. In some embodiments, the G-CN has aromatic triazine, and/or heptazine rings as a part of its basic units. In some embodiments, the graphitic carbon nitride is in the form of nanosheets. In some embodiments, the nanosheets have a thickness of 10-100 nanometers (nm), preferably 20-90 nm, 30-80 nm, 40-70 nm, or 50-60 nm. In some embodiments, the nanosheets have a 2D lamellar structure with intrinsic molecular porosity. In some embodiments, the pores have an average diameter of less than 1 nm preferably 0.01 to 1 nm, 0.05-0.8 nm, or 0.1 to 0.5 nm. When the G-CN is incorporated into the membrane, any components of a solution filtered through the membrane are limited by the size of the pores in the G-CN. Therefore, in some embodiments, the membrane is porous, having pores with an average diameter of less than 1 nm.

In an embodiment, the nanocomposite includes both a nitrogen containing conductive polymer and a conductive carbon nanomaterial. In some embodiments, the nitrogen containing conductive polymer and the conductive carbon nanomaterial are randomly mixed in the nanocomposite. In a preferred embodiment, the nitrogen containing conductive polymer and the conductive carbon nanomaterial are covalently attached to each other. In a preferred embodiment, the active layer includes a PPy@G-CN nanocomposite or "nanocomposite," which is graphitic carbon nitride (g-$C_3N_4$ or G-CN) modified with polypyrrole (PPy). In some embodiments, the G-CN is covalently bonded to the PPy in the PPy@G-CN nanocomposite. In a preferred embodiment, the G-CN is bonded to at least one terminal end of the PPy in the PPy@G-CN nanocomposite. In some embodiments, the nanocomposite is formed by wet impregnation and thermal polymerization method. In some embodiments, thermal polymerization was carried out at a temperature range of 300-600° C., preferably 400-500° C. or approximately 450° C. to obtain the nanocomposite.

In some embodiments, the nanocomposite forms about 0.01 to 5 wt. % of the active layer, preferably 0.1 to 4 wt. %, 1 to 3 wt. % or approximately 2 wt. %, based on the total weight of the active layer. In some embodiments, the nanocomposite forms 0.05-0.25 wt % of the active layer, preferably about 0.1 wt. %, based on the total weight of the active layer.

The active layer further includes a diacyl chloride compound. The diacyl chloride compound is an aromatic ring substituted with two acyl chloride groups as depicted in Formula 2 below.

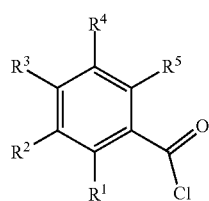

(2)

In Formula 2, one of $R^1$ to $R^5$ is another acyl chloride group and the others are independently a hydrogen, a straight or branched alkyl chain with 1 to 10 carbon atoms, or an aromatic substituent with 1 to 10 carbon atoms. In some embodiments, the two acyl chloride groups can be ortho, meta or para to each other. In some embodiments, the diacyl chloride is terephthaloyl chloride (TPC).

Alternatively, because the diacyl chloride compound acts as a linker in the active layer of the membrane (discussed later), the amount of aromatic rings can be varied to adjust the distance between the linked compounds. For example, the diacyl chloride may comprise 2 or 3 aromatic rings as shown in Formulas 3 and 4 below, respectively.

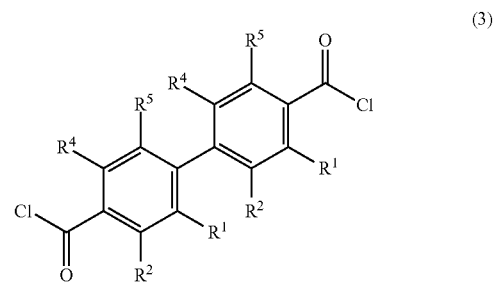

(3)

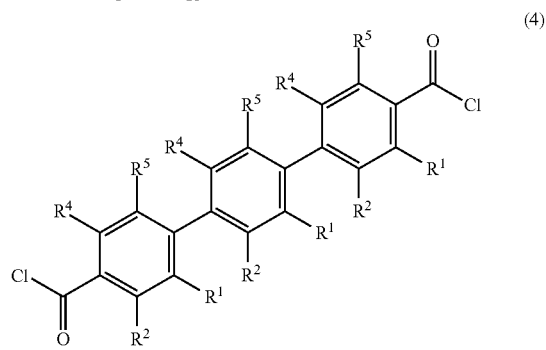

(4)

In Formulas 3 and 4 the additional aromatic rings are at the para position relative to the acyl chloride, however, one skilled in the art would recognize that the aromatic rings could also be positioned at the ortho or meta positions.

The active layer further includes a tetra-amine compound. In some embodiments, the tetra-amine compound is a linear or branched aliphatic amine with 2-50 carbons, preferably 5-40, 10-30 or approximately 20 carbons, and four amine groups. The amine groups can be evenly or unevenly spaced along the aliphatic chain. In a preferred embodiment, the amine groups are primary or secondary amines. In an embodiment, there are no tertiary amines in the tetra amine compound. In a preferred embodiment, the tetra-amine is N,N-bis(2-aminoethyl)-1,3-propanediamine.

Figure 1B:
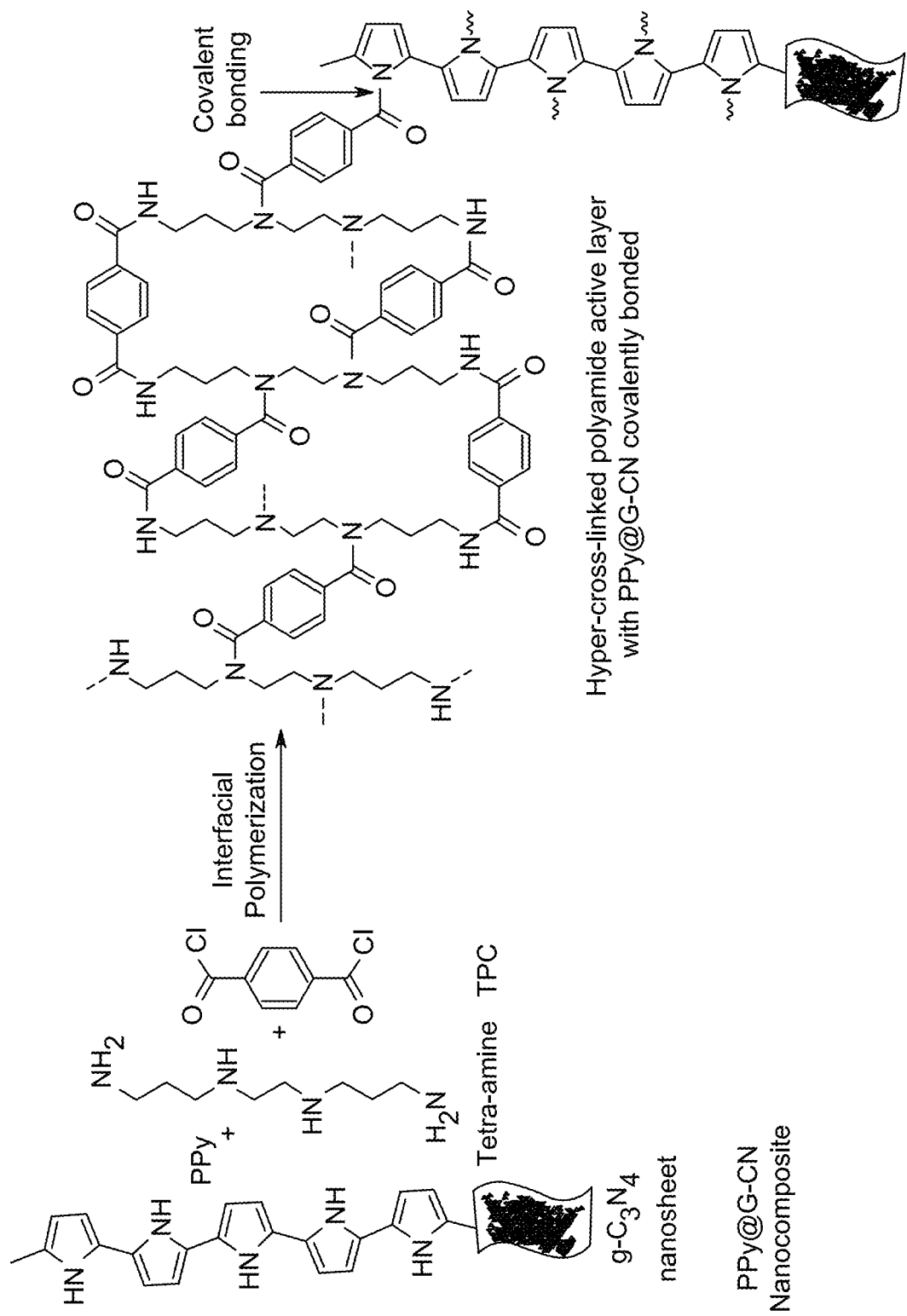
FIG. 1B is a reaction scheme depicting reaction conditions for interfacial polymerization (IP), according to certain embodiments.

In an embodiment, to fabricate the membrane, the PPy@G-CN nanocomposite is dispersed in an aqueous solution of the tetra-amine compound with the support in order to impregnant the support with the PPy@G-CN nanocomposite and the tetra-amine compound. Interfacial polymerization (IP) was then carried out on the support with a solution of the diacyl chloride compound for 0.5 to 10 minutes, preferably 1-5 minutes or 2-3 minutes. The IP reaction forms covalently crosslinked PPy@G-CN in the hyper-cross-linked polyamide active (PA) layer resulting in membranes regarded as PPy@G-CN/HCPAM. During IP, an N on a ring of the PPy becomes covalently bonded to one of the acyl groups of the diacyl chloride compound and an N on the tetra-amine compound is covalently bonded to the other acyl group of the diacyl chloride compound. Thereby, the diacyl chloride compound acts to link the PPy and the tetra-amine compound together. The diacyl chloride compound also links multiple tetra-amine compounds together. The covalent crosslinked material has the general bonding as depicted in FIG. 1B. Although, the bonding in FIG. 1B is for an embodiment with TPC, PPy and N,N-bis(2-aminoethyl)-1,3-propanediamine where all R groups are H, one skilled in the art would recognize that the R groups, the tetra-amine compound, and the diacyl chloride compound could vary as previously described and still form a structure with corresponding covalent bonding.

In some embodiments, the active layer covers at least 50%, preferably 60%, more preferably 80%, and yet more preferably more than 95% of the outer surface of the PSf/PET support. In an embodiment, the active layer covers the entire outer surface of the support. In some embodiments, the particles of the active layer have a globular shape on the support. In some embodiments, the particles of the active layer have an average size of 50-200 nm, preferably 75-175 nm, 100-150 nm, or approximately 125 nm. In some embodiments, the particles of the active layer are not agglomerated on the support. Aggregation of particles may lower the membrane's permeate flux. It is therefore preferred that there is minimal or no aggregation of the PPy@G-CN nanocomposites in the active layer of the membrane.

In some embodiments, the membrane has 50-70 atomic percent (at. %) carbon, preferably 55-65 at. %, or approximately 60 wt. %, 25-35 at. % sulfur, preferably 27-32 at. % or approximately 30 at. %, 5-15 at. % oxygen, 7-12 at. %, or approximately 10 at. % and 1-10 at. % nitrogen, 2-7 at. % or approximately 5 at. % based on a total number of atoms in the membrane.

In some embodiments, the membrane has a surface roughness of less than 24 nm, preferably less than 22 nm or 19 nm. Rough surfaces tend to foul because of the accumulation of foulants in the valleys, which reduces the permeate quality and flow rate. It is, therefore, preferred that the membrane has a smooth surface. Also, the membrane of the present disclosure has a water contact angle of less than 90°, preferably less than 85°, 80° or 75°. Generally, if the water contact angle (WCA) is smaller than 90°, the membrane is considered hydrophilic, and if the water contact angle is larger than 90°, the membrane is considered hydrophobic.

In some embodiments, the membrane has a permeate flux of 40 to 100 liter per square meter per hour ($L\ m^{-2}\ h^{-1}$) at 10-30 bar, preferably 60 to 80 or approximately 70 $L\ m^{-2}\ h^{-1}$. In some embodiments, the membrane rejects at least 60% of inorganic salts preferably 70%, 80%, 90%, or 100%.

In some embodiments, the membrane is self-cleaning following exposure to radiation. In some embodiments, the radiation is from 400-700 nm, or visible light. It is preferred that the membrane is self-cleaning under visible light and that UV light is not required, in order to prevent damage to the membrane. The mechanism of self-cleaning is based on the generation of reactive oxygen species following irradiation. The photo-generated $e^-$ react with surface oxygen ($O_2$), producing superoxide radical $.O_2^-$ which in turn reacts with water and is transferred to hydroxyl radical, $.OH$ and the photo-generated $h^+$ generated on G-CN reacts with the foulant leading to the degradation of the foulant on the membrane surface.

EXAMPLES

The disclosure will now be illustrated with working examples, which is intended to illustrate the working of disclosure and not intended to restrictively imply any limitations on the scope of the present disclosure. The working examples depict a membrane of the present disclosure.

Example 1: Materials

Melamine, pyrrole, $FeCl_3$, Eriochrom Black T (EBT), NaCl, $Na_2SO_4$, $MgCl_2$, $CaCl_2$, $MgSO_4$, hexane, triethylamine (TEA), polysulfone (PSf), dimethyl acetamide (DMAc), N,N-bis(2-aminoethyl)-1,3-propanediamine, NaOH, terephthaloyl chloride (TPC), DI water and polyester terephthalate (PET) supports were used as it is without any further purification/treatment.

Example 2: Synthesis of PPy@G-CN Nanocomposite

PPy@G-CN nanocomposite refers to a nanocomposite of polypyrrole (PPy) and graphitic carbon nitride (G-CN). The PPy@G-CN nanocomposite photocatalyst was synthesized by a wet impregnation approach coupled with a thermal polymerization method. For the synthesis of PPy@G-CN nanocomposite photocatalyst, polypyrrole (PPy) was initially prepared by oxidative polymerization method using pyrrole as monomer and $FeCl_3$ as an oxidizing agent. An aqueous solution of 1% pyrrole monomer (100 mL) was taken in a round bottom flask equipped with a magnetic stirrer. Then a 2% aqueous solution of $FeCl_3$ (100 mL) was added dropwise at room temperature. This reaction was continued for 24 h under the same conditions to complete the polymerization process. After 24 h, the resultant precipitate was filtered and washed several times with de-ionized water and methanol. After complete washing, the resulting precipitate was dried in an air oven at 100° C. to obtain PPy powder.

After the synthesis of PPy, it was dispersed in ethanol using an ultrasonication bath and then mixed with 10 g melamine powder to obtain a homogeneous paste of PPy/melamine powder. The homogenized paste was dried at 80° C. for 30 min in an alumina crucible and then thermally polymerized at 550° C. in an air oven for 4 h to obtain PPy-incorporated bulk-G-CN. After obtaining the PPy incorporated bulk-G-CN, it was finely crushed by a pestle and mortar and then thermally polymerized again at 300° C. in an air oven for 24 h to obtain the nanosheets of PPy@G-CN nanocomposite.

Example 3: Fabrication of PPy@G-CN/HCPAM

In the examples, HCPAM alone, also referred to as the pristine membrane, refers to a membrane made by the following process, with hyper cross-linked polyamide, but without the addition of the PPy@G-CN nanocomposite, and PPy@G-CN/HCPAM refers to a membrane with the PPy@G-CN nanocomposite. The thin film composite (TFC) PPy@G-CN/HCPAM membrane was fabricated through interfacial polymerization (IP). The polysulfone (PSf) ultrafiltration support was prepared by phase inversion on PET support and kept in DI water overnight, followed by dipping the PSf/PET support in 0.05% sodium dodecyl sulfate (SDS) for 24 h to increase the wettability of support. An aqueous solution (2%) of amine-containing a certain amount (0.05%, 0.10%, and 0.25%) of the PPy@G-CN nanocomposite was prepared and thoroughly homogenized by a probe sonicator for 30 min. Then PSf/PET support was dipped in an aqueous solution (2%) of amine-containing PPy@G-CN nanocomposite, and the impregnation was carried out for 10 minutes.

After amine impregnation, the excess amine solution was removed using a rubber roller, and the membrane was dried in the air. The membrane was further dipped into n-hexane solution (0.15%) of terepthaloyl chloride (TPC). The IP was carried out for 60 seconds, forming an active polyamide layer containing covalently cross-linked photocatalytic PPy@G-CN nanocomposite. The fabricated membrane PPy@G-CN/HCPAM was dipped in DI water before the nanofiltration test. The various phases of membrane fabrication are depicted in (FIG. 1A), while the reaction conditions for interfacial polymerization are provided in FIG. 1B. The membranes are labeled throughout as 0.05%-PPy@G-CN/HCPAM, 0.10%-PPy@G-CN/HCPAM, and 0.25%-PPy@G-CN/HCPAM, depending on the amount of the PPy@G-CN nanocomposite added.

Example 4: Characterization Techniques

The PPy@G-CN nanocomposite and pure G-CN were characterized by UV-Vis spectroscopy to evaluate the photophysical features of the G-CN and PPy@G-CN nanocomposite using JASCO V-670 spectrophotometer. The chemical structure and nature of various functionalities present in G-CN, PPy@G-CN nanocomposite, and membranes samples were determined using ATR-FTIR (FTIR, Nicolet iS50, Thermo Fisher Scientific). The water contact angle was measured using a goniometer (CA-Drop Shape Analyzer DSA100E, KRUSS). The surface morphological features of the membranes were determined by FESEM (Qauttro, Thermo Fisher Scientific). The elemental composition of the membrane was determined by EDX analysis, while the elemental distribution was determined by elemental mapping. The surface roughness of the membranes was measured by AFM (Agilent 5500 AFM), while the surface chemical composition was studied by XPS (VG Scientific ESCALAB MKII spectrometer).

Example 5: Nanofiltration Experiments

Figure 2:
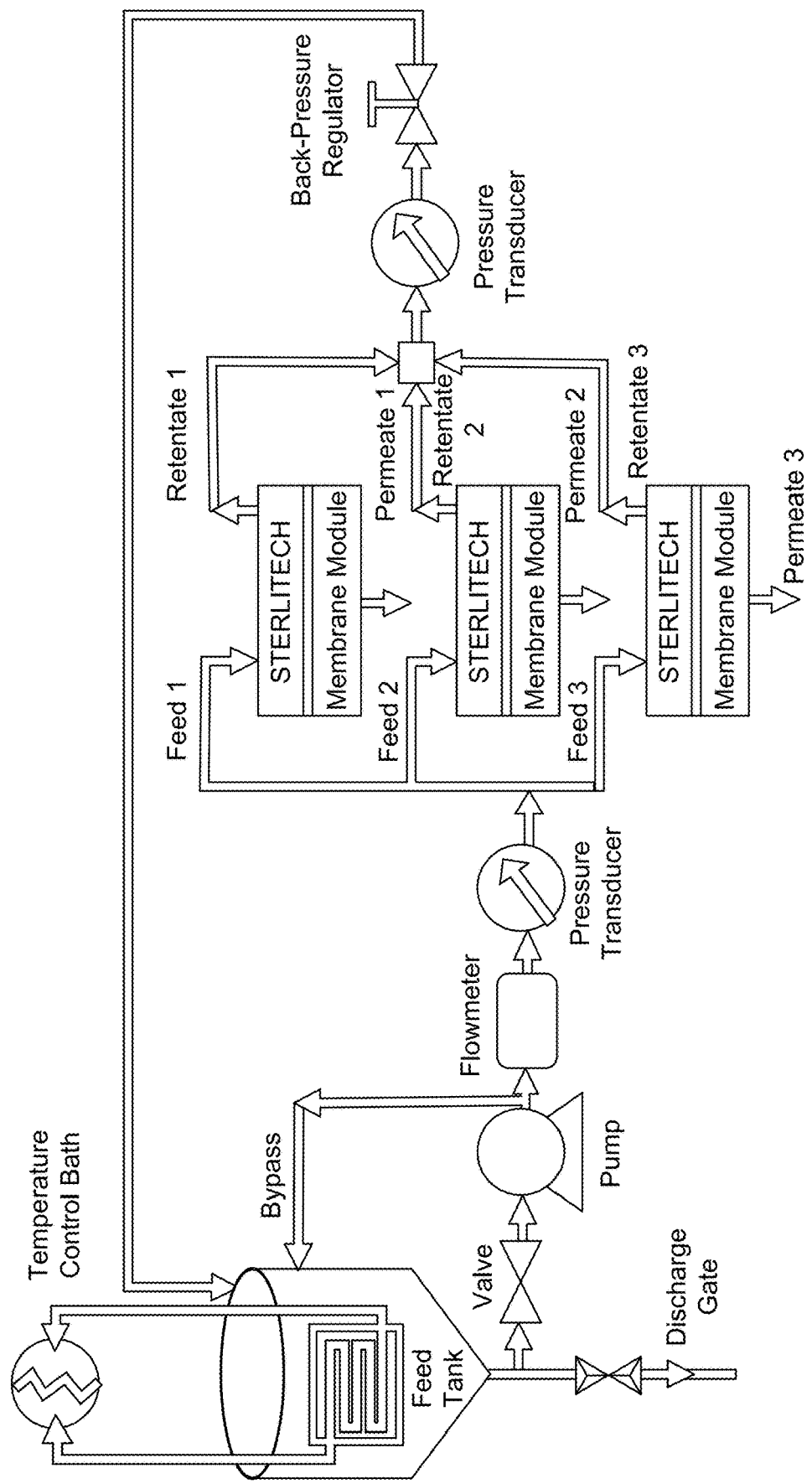
FIG. 2 illustrates a schematic diagram of a crossflow filtration setup, according to certain embodiments.

Nanofiltration experiments were performed on a crossflow filtration setup (Sterlitech), as demonstrated in the schematic diagram in FIG. 2. The crossflow filtration setup was composed of a feed tank attached to a cooling condenser or a temperature cool bath, while the feed outlet was connected with a high-pressure pump connected to a flowmeter, and a pressure transducer and feed were supplied to three parallelly connected membrane cells (membrane modules). The membrane module had one inlet and two outlets (one for retentate and one for permeate), and the permeates were returned to the feed tank through one inlet into the feed tank. All three membranes were installed in the membrane modules simultaneously, and the feed was changed according to the experimental requirements. The used feed solution was discarded through the discharge gate. For the measurement of water flux, DI water was used as feed, and the flux was estimated by using the following Eq. (1)

$$J = \frac{V}{A \times t} \quad \text{Eq. (1)}$$

where the water flux is represented by J (L m$^{-2}$ h$^{-1}$) while V (L) is the volume of the permeate generated during a given period, t (h) that has passed through the membrane during crossflow filtration experiments whereas A is the area (m$^2$) of the membrane. The rejection was estimated by using Eq. (2).

$$R = \left(1 - \frac{C_p}{C_f}\right) \times 100 \quad \text{Eq. (2)}$$

The R shows the percentage rejection of solutes during nanofiltration crossflow experiments, while Cp gives the concentration of the solutes and Cf gives the feed solution. The concentration of various salts was kept at 2 g·L$^{-1}$, which was measured by a conductivity meter (Ultrameter II). The concentration of the dyes in the feed (10 mg·L$^{-1}$) and permeate was estimated by UV-visible (Vis) analysis.

Example 6: Photocatalytic Self-Cleaning Experiment

The photocatalytic self-cleaning of the fouled PPy@G-CN/HCPAM membrane was performed to eliminate the organic fouling from the membrane surface. For this experiment, a photo-responsive PPy@G-CN/HCPAM membrane fouled by organic dye (EBT) during the crossflow filtration test was removed carefully from the membrane module. Then the fouled membrane was immersed in de-ionized water of 0.5 cm height in a glass container. After that fouled membrane was illuminated by simulated solar light using a light source (Xenon Lamp; Intensity: 100 mW/cm$^2$) for the photocatalytic degradation of organic foulant adsorbed on the membrane surface.

Example 7: Membrane Characterization and Performance

Figure 3:
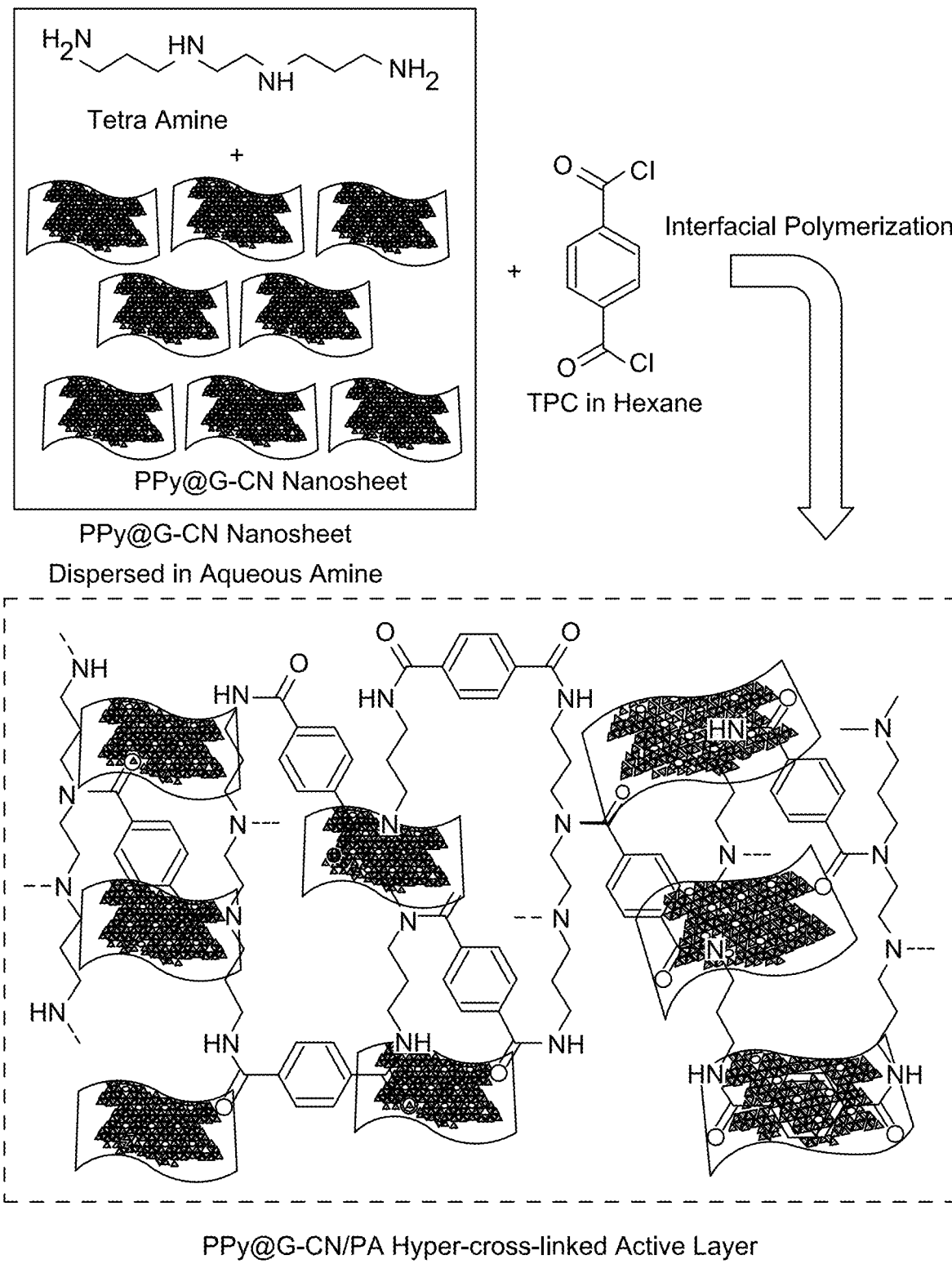
FIG. 3 depicts reaction conditions of the IP and a PPy@G-CN (graphitic carbon nitride modified with polypyrrole) composite containing a hyper-cross-linked polyamide active layer of a membrane (PPy@G-CN/HCPAM), according to certain embodiments.

The selection of G-CN was attributed to its salient feature of being a photocatalyst as, among the various photocatalytic semiconducting materials, G-CN is unique in having aromatic triazine and heptazine rings as a part of its basic units leading to the formation of a 2D lamellar structure with intrinsic molecular porosity. Moreover, the G-CN possesses a band gap of 2.7 eV which can absorb light in the violet-blue range, making G-CN a polymeric semiconducting material [R. Liu, Z. Chen, Y. Yao, Y. Li, W. A. Cheema, D. Wang, S. Zhu, Recent advancements in g-C3N4-based photocatalysts for photocatalytic CO$_2$ reduction: a mini-review, RSC Adv. 10 (2020) 29408-29418]. G-CN is a polymeric metal-free semiconducting material, so it is highly compatible for nanocomposite formation with PPy (another polymer with extended π-conjugation in its backbone). Numerous amine functionalities (—N—H) are readily available along the polymer chains of PPy. The thermal polymerization of melamine among the chains of PPy led to the formation of highly homogenous PPy@G-CN nanocomposite having salient features of both components, such as the photocatalytic potential of G-CN, and the light gathering capability of PPy, which augments the photocatalytic potential of G-CN. Moreover, the availability of free —N—H groups of PPy in the PPy@G-CN nanocomposite photocatalyst provided sites for cross-linking with the acid chloride group of TPC during interfacial polymerization (FIG. 3).

Furthermore, the intrinsic molecular porosity of triazine and heptazine subunits of G-CN played a role in the nanofiltration performance of the fabricated membrane PPy@G-CN/HCPAM. The inherent molecular porosity of G-CN introduced specific pore sizes in the membrane's structure, allowing only precisely sized molecules to pass through while rejecting other molecules. Hence, intrinsic molecular porosity played a role in rejecting solutes from the feed.

The selection of linear tetramine with multiple amine functions in a single molecule offered multiple reaction sites for hyper-crosslinking, while the linear structure of TPC allows the minimized stearic hindrance among the chains resulted in a hyper-cross-linked polyamide active layer on the PSf/PET support. Moreover, the free —N—H of PPy contributed to cross-linking with TPC during IP, which led to a covalently linked PPy@G-CN photocatalyst in the hyper-cross-linked polyamide active layer, thereby preventing leaching of the photocatalyst during the membrane operation. The reaction conditions and various reactants, along with the possible structure of the fabricated membrane, are given in FIG. 3.

Figure 4A:
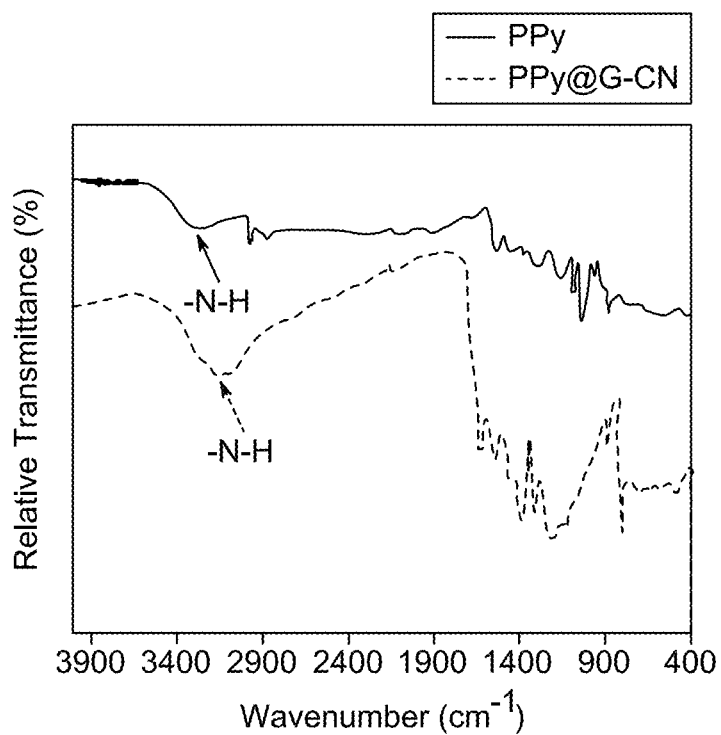
FIG. 4A is a plot depicting an attenuated total reflectance-Fourier transform infrared (ATR-FTIR) spectra of polypyrrole (PPy) and the PPy@G-CN composite, according to certain embodiments.
Figure 5A:
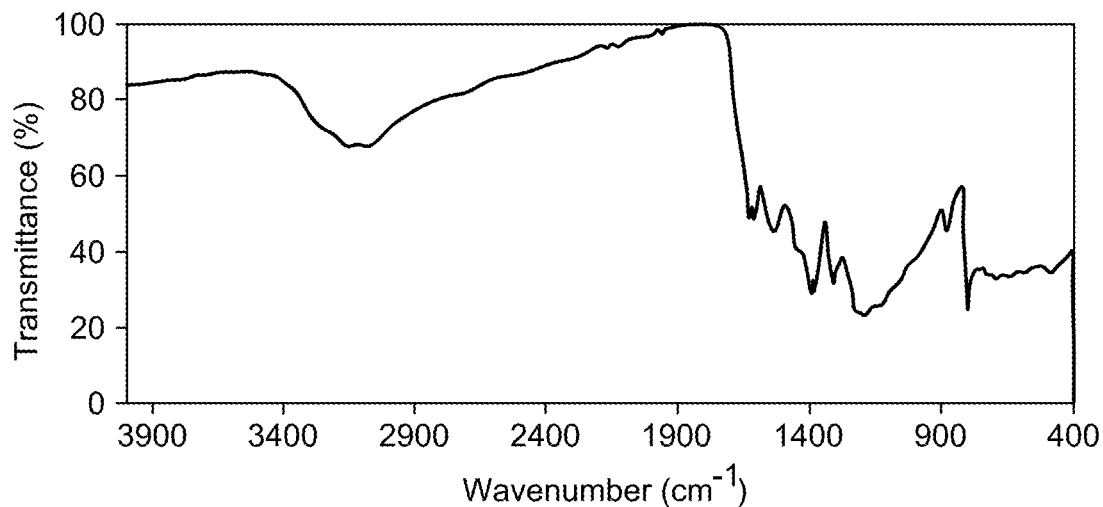
FIG. 5A depicts an FTIR spectrum of a pure graphitic carbon nitride (G-CN), according to certain embodiments.

The G-CN and PPy@G-CN nanocomposite photocatalyst was characterized by ATR-FTIR, PXRD, and UV-DRS. It was evident from the FT-IR spectra of PPy (FIG. 4A) and G-CN (FIG. 5A) that a broad amine-N—H peak is located at around 3400 $cm^{-1}$ while the same peak is also present in PPy@G-CN nanocomposite which confirmed the presence of the reacting components in PPy@G-CN nanocomposite.

Figure 4B:
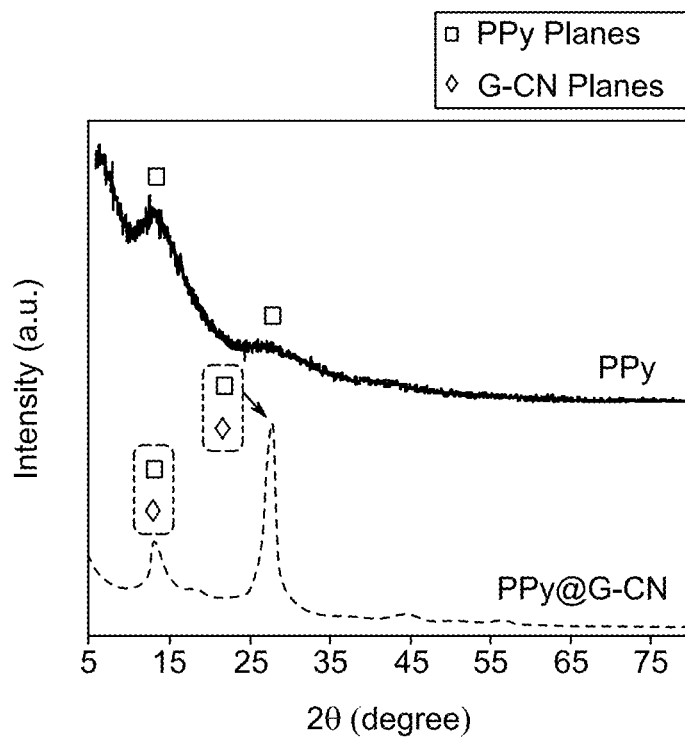
FIG. 4B is a plot depicting powder X-ray diffraction (PXRD) spectra of PPy and the PPy@G-CN composite, according to certain embodiments.
Figure 4C:
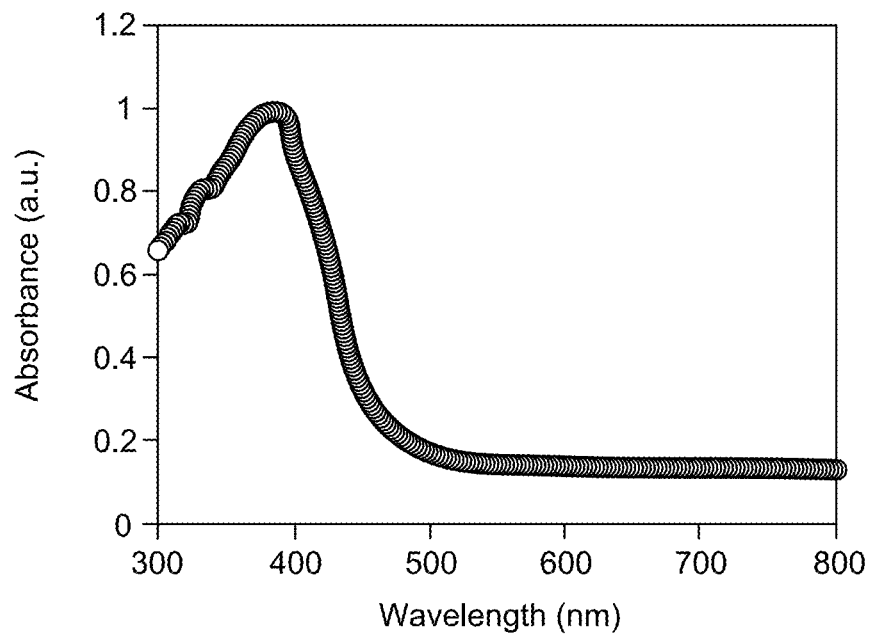
FIG. 4C is a plot depicting ultraviolet-visible (UV-Vis) spectra of the PPy@G-CN composite, according to certain embodiments.
Figure 4D:
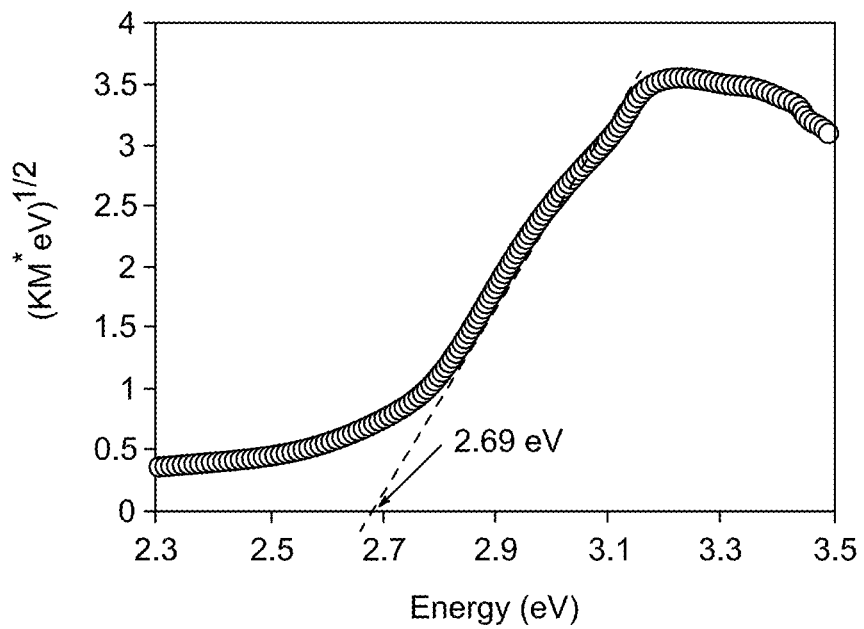
FIG. 4D depicts a Tauc plot of the PPy@G-CN composite, according to certain embodiments.
Figure 5B:
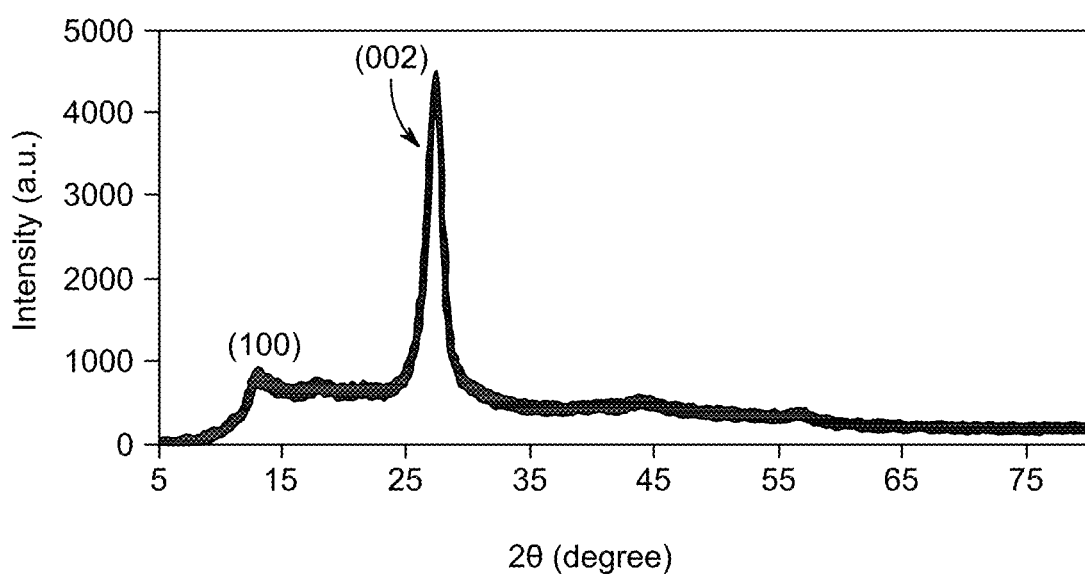
FIG. 5B depicts an XRD pattern of the pure G-CN, according to certain embodiments.
Figure 5C:
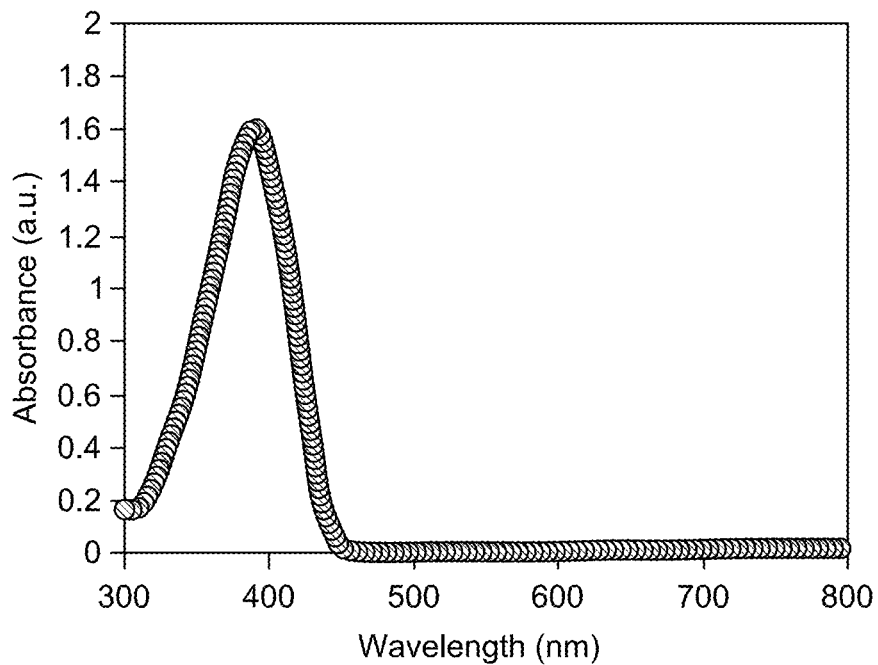
FIG. 5C is an ultraviolet-diffusion reflectance spectroscopy (UV-DRS) spectrum of the pure G-CN, according to certain embodiments.
Figure 5D:
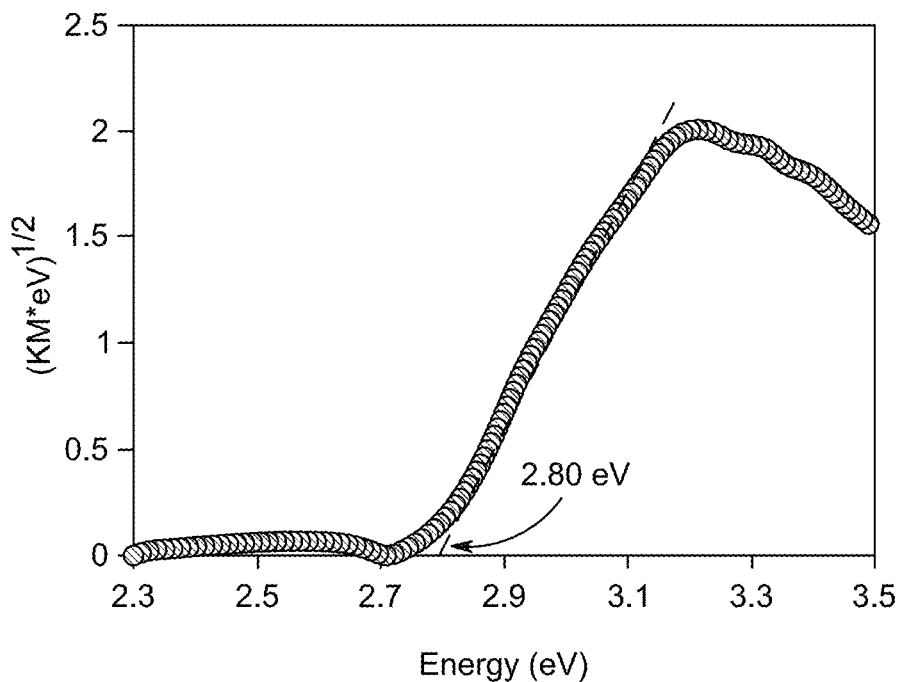
FIG. 5D is a Tauc plot of the pure G-CN, according to certain embodiments.

The PXRD patterns of G-CN, PPy, and PPy@G-CN nanocomposite are given in FIG. 4B, where it can be seen that the PPy lacked the sharp peaks, while with the PPy@G-CN nanocomposite, two sharp peaks at 13° and 26°, were observed, which are attributed to the presence of G-CN in the nanocomposite as PXRD of G-CN possessed similar peaks (FIG. 5B). To evaluate the photo-physical features of G-CN (FIG. 5C) and the PPy@G-CN nanocomposite (FIG. 4C), the UV-DRS spectra were recorded. It was observed that both materials absorbed light in a mixed UV-visible region of the light spectrum. Moreover, the calculation of the band gap for G-CN (FIG. 5D) and PPy@G-CN nanocomposite photocatalyst (FIG. 4D) showed a value of 2.80 eV and 2.69 eV, respectively. Whenever there is a dopant or a loading material in the host material, donor state or defects state are formed below the conduction band of the host materials. When absorption accrues, a transition occurs from the valence band of the host material to the newly formed low-lying defects state, which reduces the bandgap energy.

The evidence of various functionalities in the pristine membrane and PPy@G-CN/HCPAM was obtained by ATR-FTIR, as shown in FIG. 6A-B. The broad and deep band in the region of 3600 $cm^{-1}$ to 3400 $cm^{-1}$ is attributed to the presence of amide —N—H linkages of the polyamide network in the active layer of the membrane. The peaks at around 3100 $cm^{-1}$ to 2900 $cm^{-1}$ are attributed to the aromatic —CH and aliphatic —CH and —$CH_2$, which are attributed to the presence of aliphatic tetra-amine and aromatic TPC. In the case of PPy@G-CN/HCPAM, the amide peak in the 3600 $cm^{-1}$ to 3400 $cm^{-1}$ gets deeper with the increasing concentration of PPy@G-CN nanocomposite, hinting at the presence of the PPy@G-CN nanocomposite in the membrane. The peak located at around 1650 $cm^{-1}$ is of the carbonyl (C=O), which is due to the amide (—CONH) and PET carbonyl moieties. Moreover, FIG. 6B shows more of the fingerprint region of the membranes.

Figure 7:
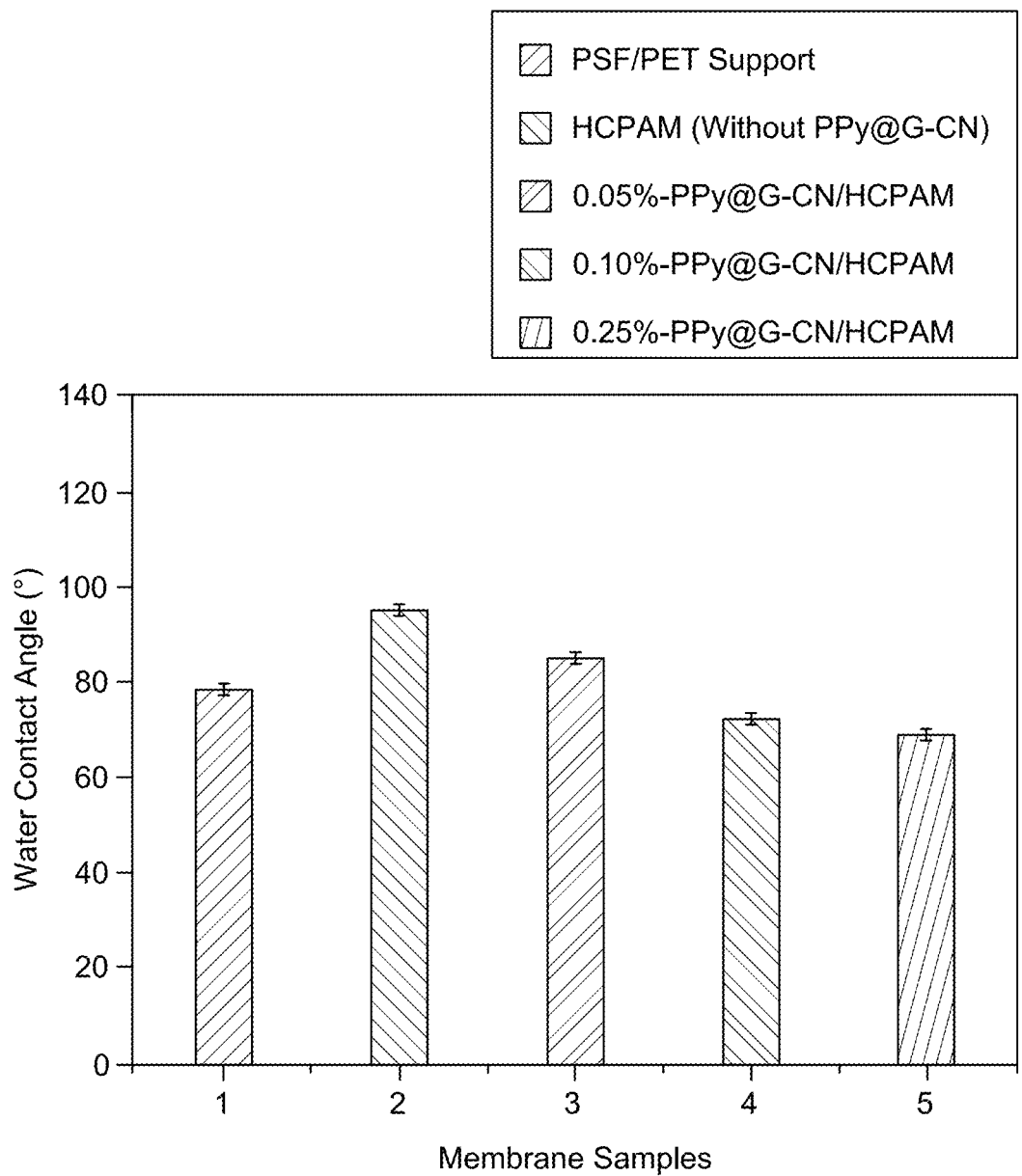
FIG. 7 is a plot depicting a water contact angle (WCA) of a polysulfone/polyethylene terephthalate (PSf/PET) support, the pristine membrane (HCPAM), and various PPy@G-CN/HCPAM membranes, each with different proportions of PPy in the PPy@G-CN composite, according to certain embodiments.
Figure 8A:
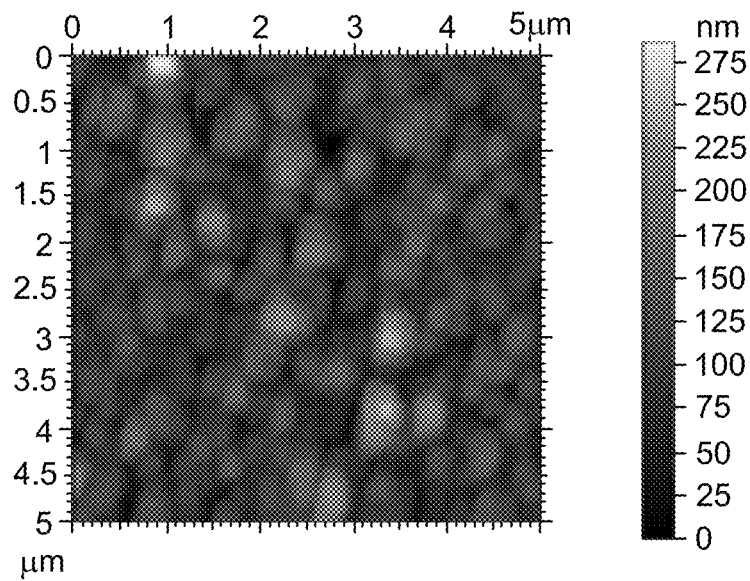
FIG. 8A is a two-dimensional (2D) atomic focal microscopy (AFM) image of the pristine (HCPAM) membrane, according to certain embodiments.
Figure 8B:
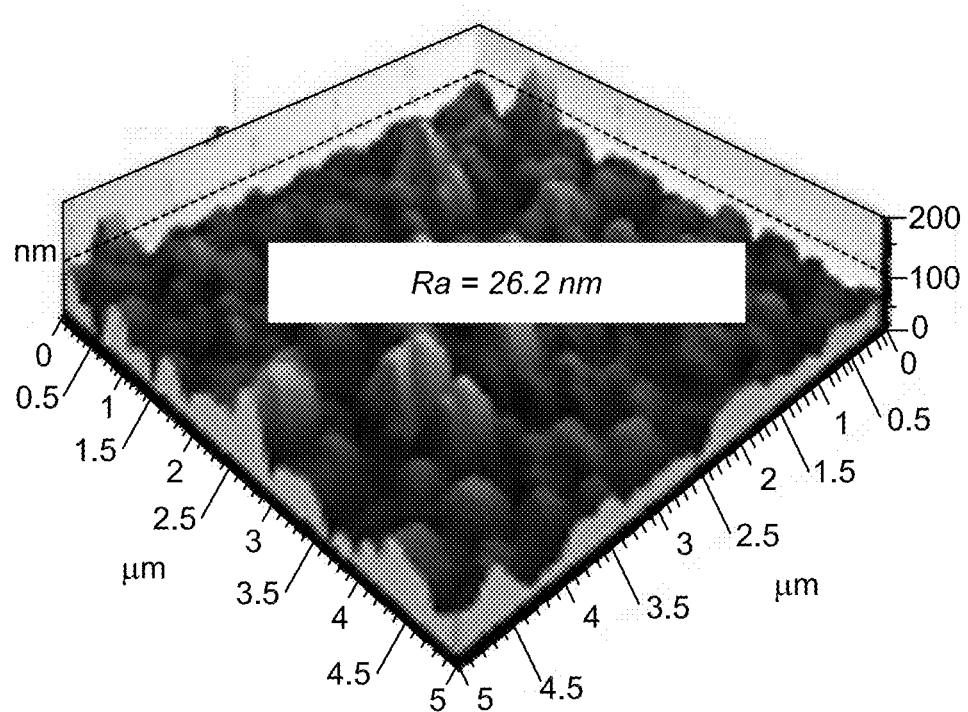
FIG. 8B depicts a three-dimensional (3D) AFM images of the pristine (HCPAM) membrane, according to certain embodiments.
Figure 8C:
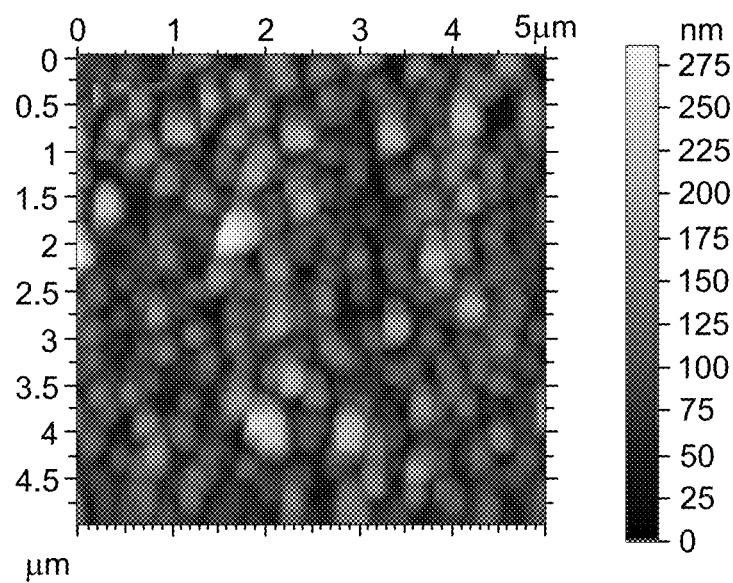
FIG. 8C depicts a 2D AFM image of 0.05%-PPy@G-CN/HCPAM membrane, according to certain embodiments.
Figure 8D:
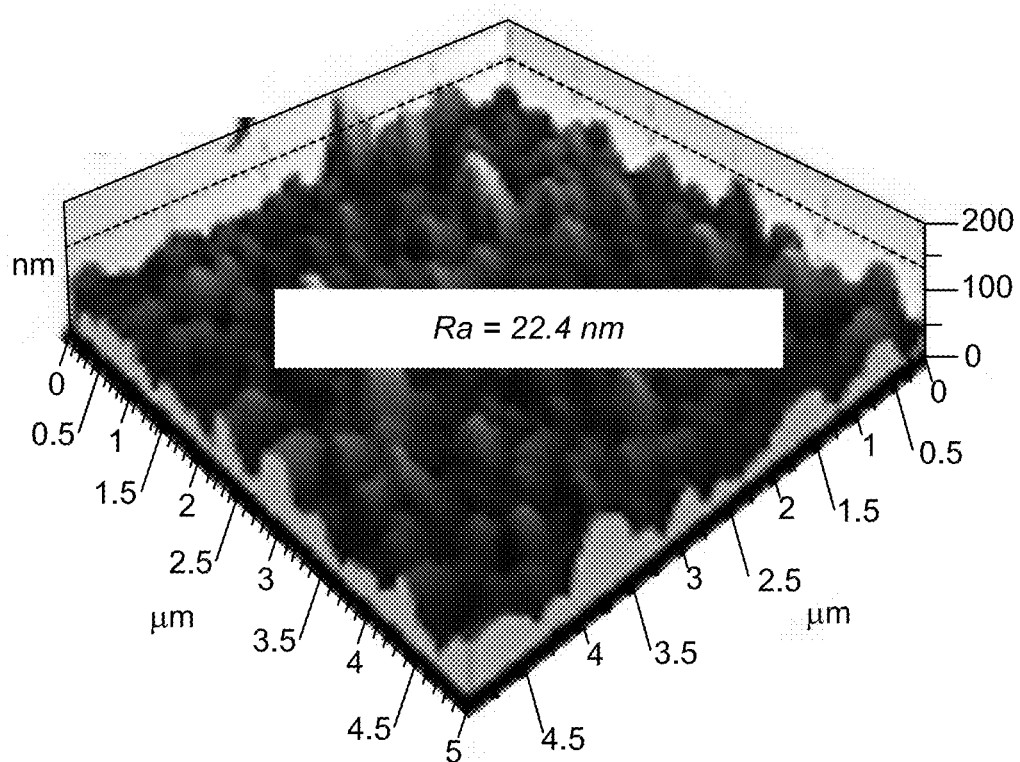
FIG. 8D depicts a 3D AFM image of the 0.05%-PPy@G-CN/HCPAM membrane, according to certain embodiments.
Figure 8E:
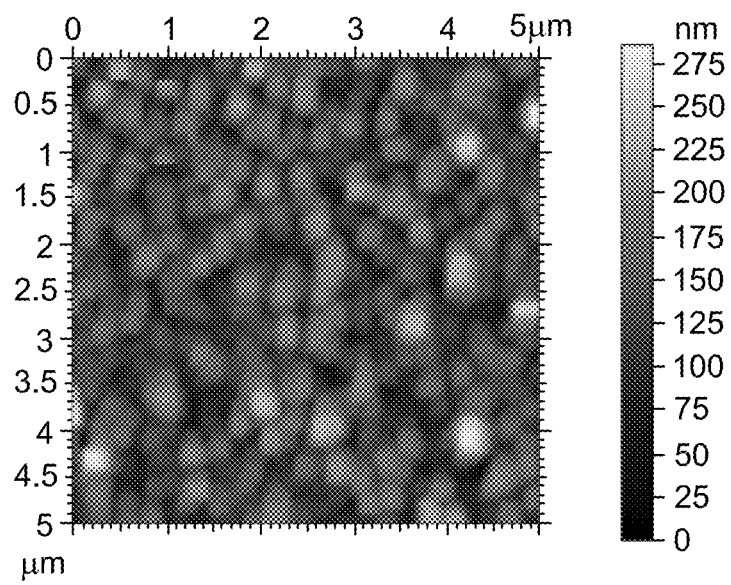
FIG. 8E depicts a 2D AFM image of a 0.1%-PPy@G-CN/HCPAM membrane, according to certain embodiments.
Figure 8F:
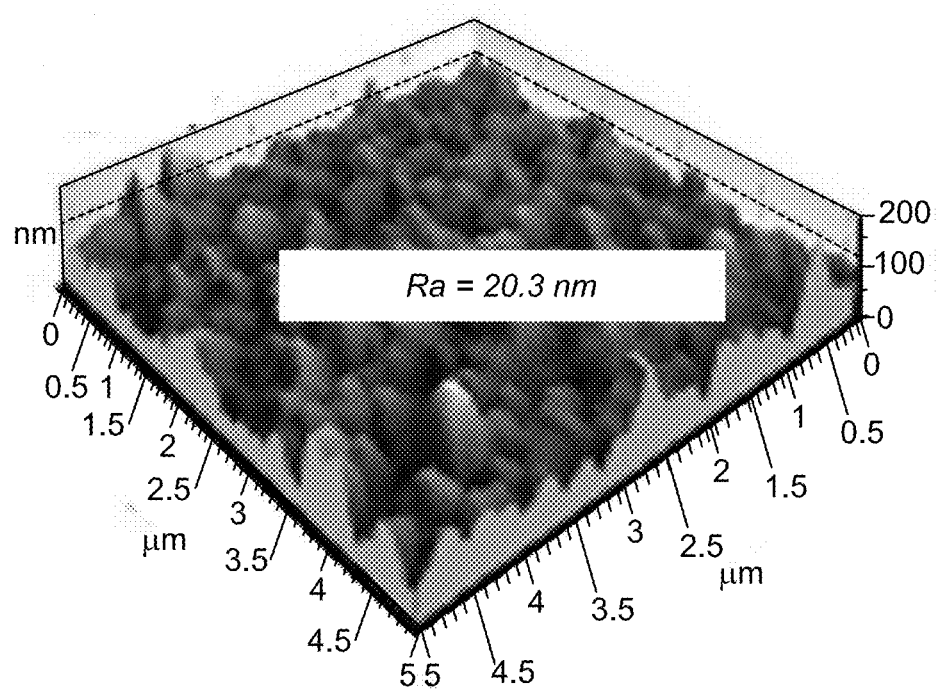
FIG. 8F depicts a 3D AFM image of the 0.1%-PPy@G-CN/HCPAM membrane, according to certain embodiments.
Figure 8G:
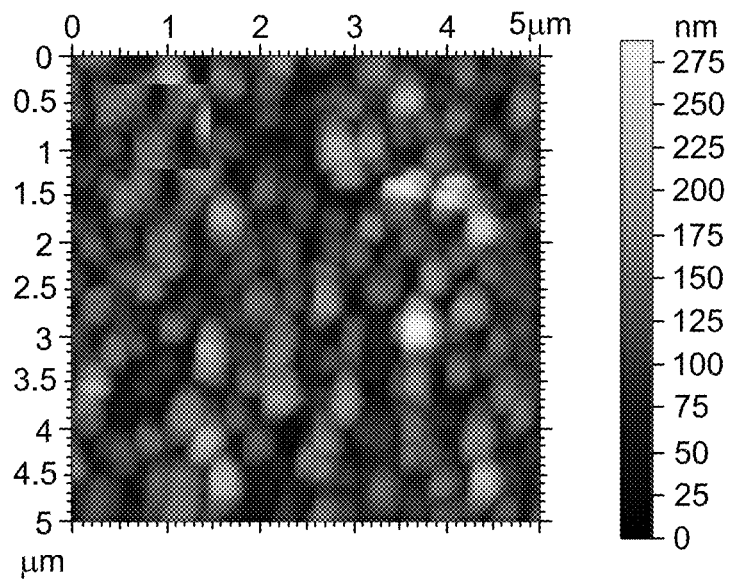
FIG. 8G depicts a 2D AFM image of a 0.25%-PPy@G-CN/HCPAM membrane, according to certain embodiments.
Figure 8H:
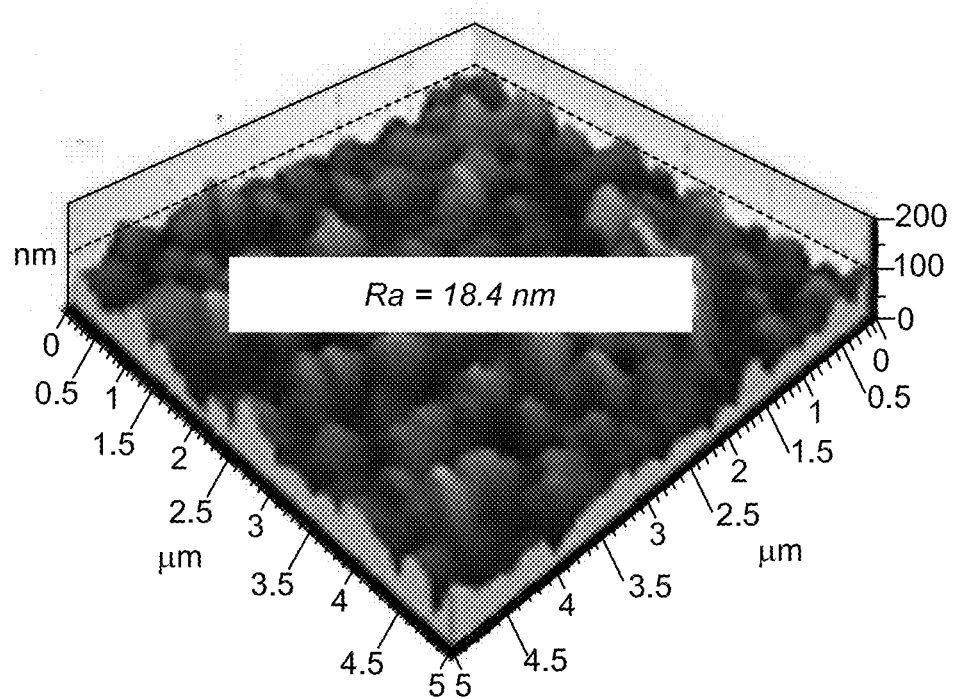
FIG. 8H depicts a 3D AFM image of the 0.25%-PPy@G-CN/HCPAM membrane, according to certain embodiments.

The surface hydrophilic features of ultrafiltration support (PSf/PET), pristine membrane (HCPAM), and PPy@G-CN/HCPAM with various proportions of PPy@G-CN nanocomposite photocatalyst were determined by water contact angle (WCA) (FIG. 7). It can be seen that WCA of PSf/PET support increases from 78.35° to 96.50° which was attributed to the formation polyamide active layer in case of HCPAM. However, after the inclusion of the PPy@G-CN nanocomposite, the WCA decreased to 88.21°, 75.11°, and 70.12° with the addition of 0.05%, 0.10%, and 0.25% of PPy@G-CN, respectively. An increase in WCA after the deposition of an active polyamide layer in the case of HCPAM was attributed to the formation of a highly rough surface. A decrease in WCA upon adding 0.1% of PPy@G-CN nanocomposite in the membrane fabrication was attributed to the formation of a relatively hydrophilic polyamide active layer due to the hydrophilic nature of the PPy@G-CN nanocomposite.

The surface roughness of all membranes was estimated by atomic force microscopy (AFM), as shown in FIGS. 8A-H. It is evident that the average surface roughness (Ra) of pristine HCPAM was 26.2±0.05 nm (FIG. 8A and FIG. 8B) while Ra decreases to 22.4±0.05 nm, 20.3±0.05 nm, and 18.4±0.05 nm for 0.05% (FIG. 8C and FIG. 8D), 0.10% (FIG. 8E and FIG. 8F) and 0.25% (FIG. 8G and FIG. 8H) of PPy@G-CN nanocomposite incorporated HCPAM membranes. The decrease in surface roughness of the membrane upon the addition of PPy@G-CN also highlights the fact that PPy@G-CN nanocomposite has actively participated in crosslinking reactions during the IP. Based on the different observations during the membrane performance evaluation, 0.1% of PPy@G-CN nanocomposite had a suitable concentration for membrane fabrication.

Figure 9F:
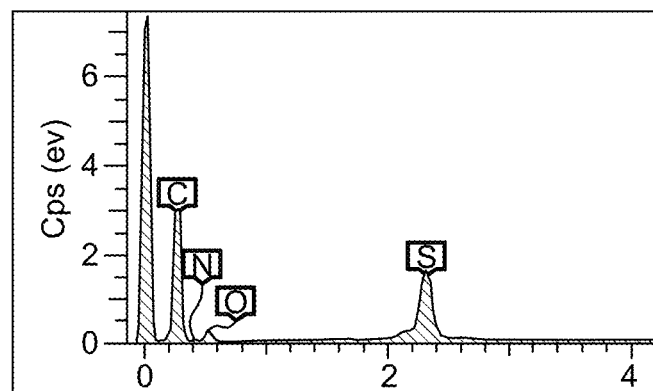
FIG. 9F depicts the EDX analysis of the HCPAM membrane, according to certain embodiments.
Figures 9G, 9H:
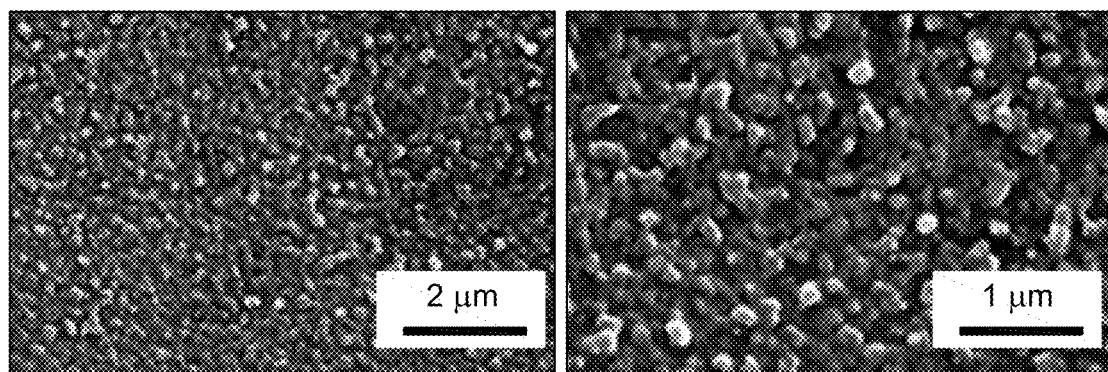
FIGS. 9G and 9H depict FESEM images of the PPy@G-CN/HCPAM membrane, at two different magnifications, according to certain embodiments.
Figure 9I:
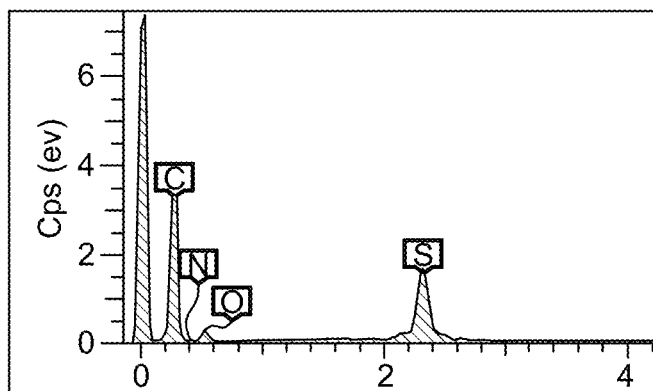
FIG. 9I depicts the EDX analysis of the PPy@G-CN/HCPAM membrane, according to certain embodiments.
Figure 10A:
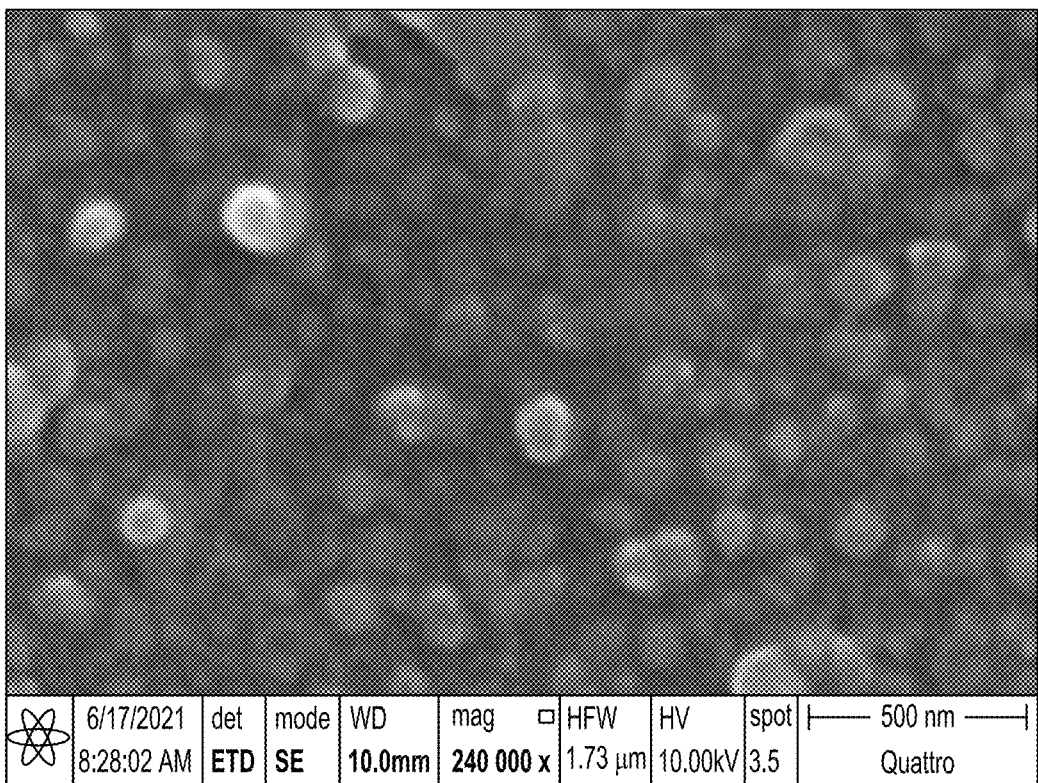
FIG. 10A depicts an FESEM image of the pristine HCPAM membrane, according to certain embodiments.
Figure 10B:
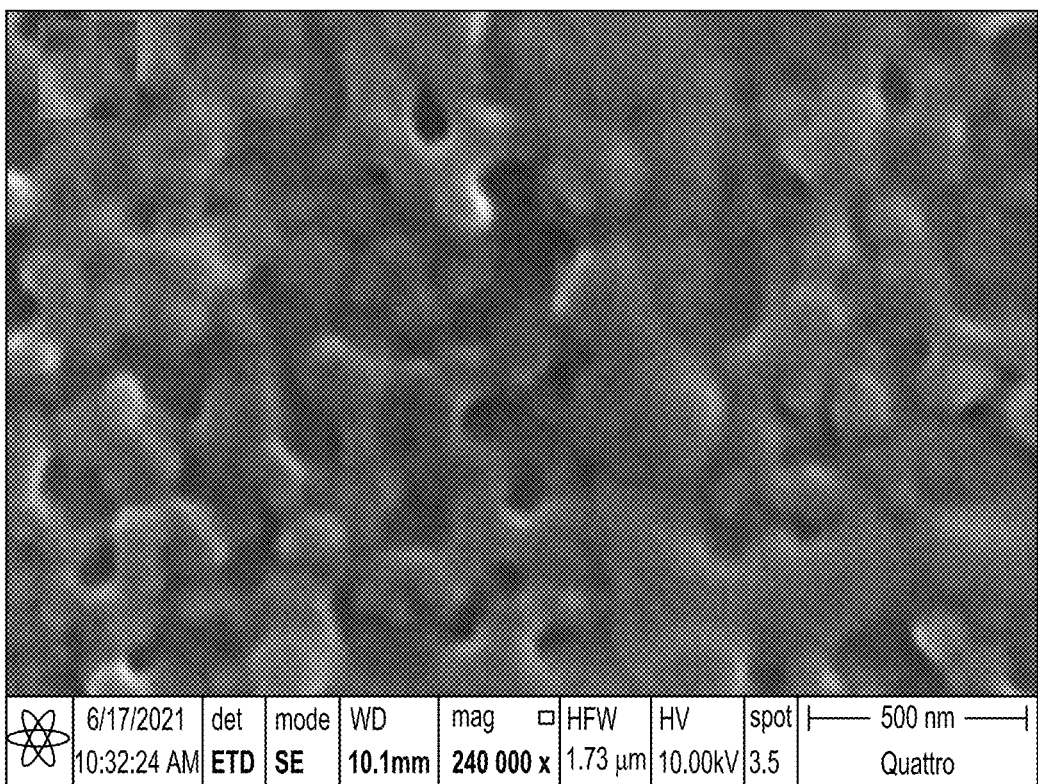
FIG. 10B depicts an FESEM image of the PPy@G-CN/HCPAM membrane, according to certain embodiments.
Figure 11A:
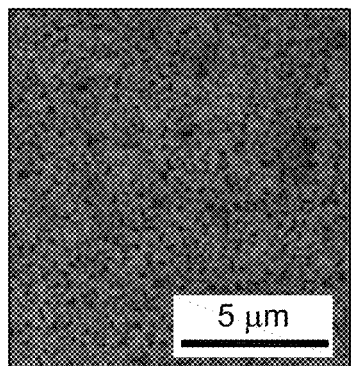
FIG. 11A depicts an EDX elemental mapping analysis image of the PSf/PET support, according to certain embodiments.
Figure 11B:
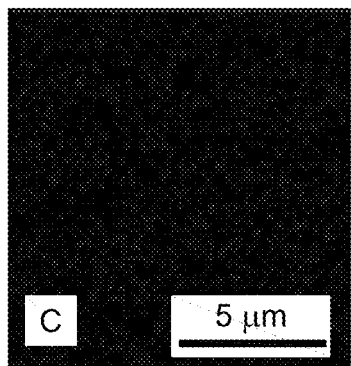
FIG. 11B depicts an EDX elemental mapping analysis image of the PSf/PET support showing a uniform distribution of carbon, according to certain embodiments.
Figure 11C:
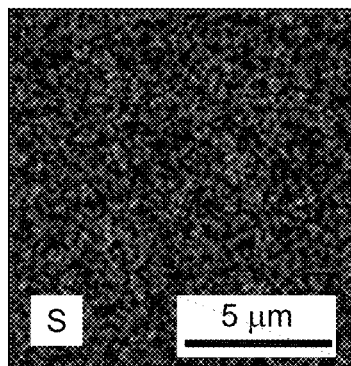
FIG. 11C depicts an EDX elemental mapping analysis image of the PSf/PET support showing a uniform distribution of sulfur, according to certain embodiments.
Figure 11D:
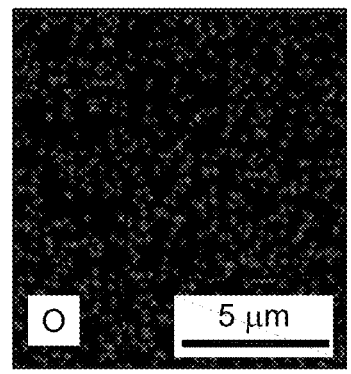
FIG. 11D depicts an EDX elemental mapping analysis image of the PSf/PET support showing a uniform distribution of oxygen, according to certain embodiments.
Figure 11E:
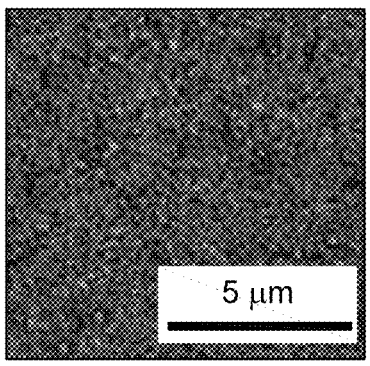
FIG. 11E depicts an EDX elemental mapping analysis image of the pristine HCPAM membrane, according to certain embodiments.
Figure 11F:
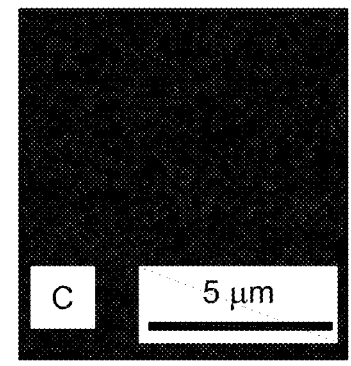
FIG. 11F depicts an EDX elemental mapping analysis image of the pristine HCPAM membrane showing a uniform distribution of carbon, according to certain embodiments.
Figure 11G:
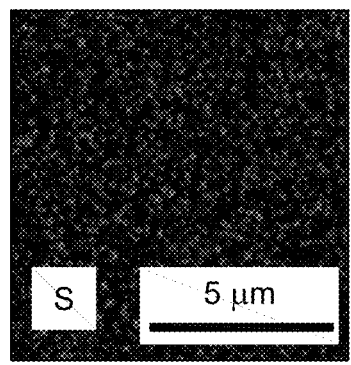
FIG. 11G depicts an EDX elemental mapping analysis image of the pristine HCPAM membrane showing a uniform distribution of sulfur, according to certain embodiments.
Figure 11H:
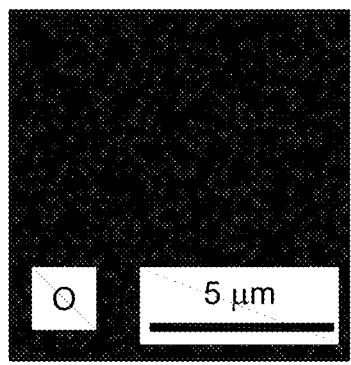
FIG. 11H depicts an EDX elemental mapping analysis image of the pristine HCPAM membrane showing a uniform distribution of oxygen, according to certain embodiments.
Figure 11I:
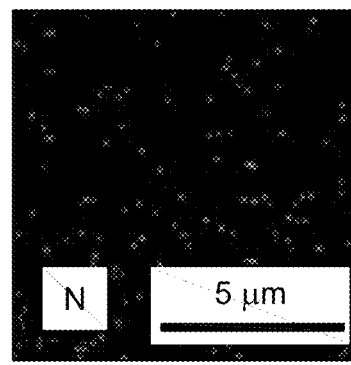
FIG. 11I depicts an EDX elemental mapping analysis image of the pristine HCPAM membrane showing a uniform distribution of nitrogen, according to certain embodiments.
Figure 11J:
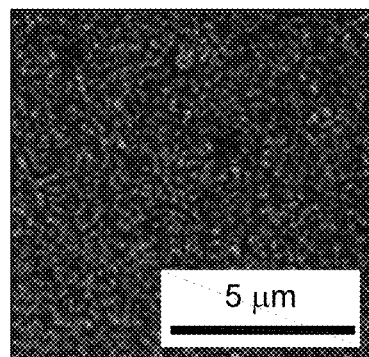
FIG. 11J depicts an EDX elemental mapping analysis image of the PPy/G-CN/HCPAM membrane, according to certain embodiments.
Figure 11K:
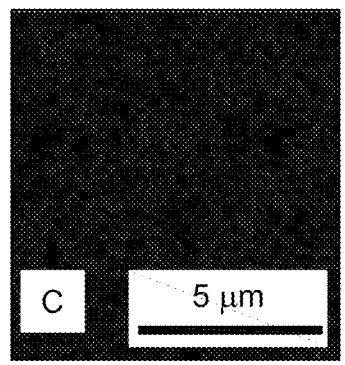
FIG. 11K depicts an EDX elemental mapping analysis image of the PPy/G-CN/HCPAM membrane showing a uniform distribution of carbon, according to certain embodiments.
Figure 11L:
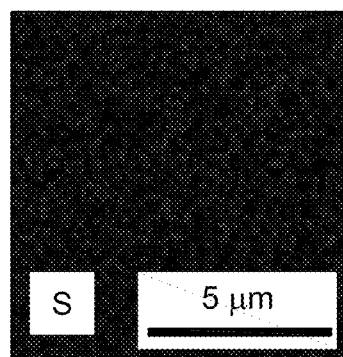
FIG. 11L depicts an EDX elemental mapping analysis image of the PPy/G-CN/HCPAM membrane showing a uniform distribution of sulfur, according to certain embodiments.
Figure 11M:
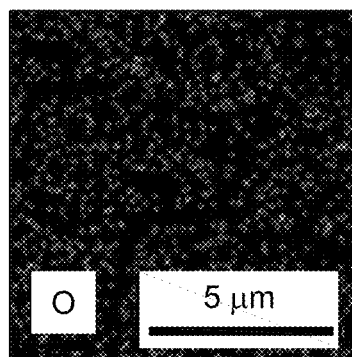
FIG. 11M depicts an EDX elemental mapping analysis image of the PPy/G-CN/HCPAM membrane showing a uniform distribution of oxygen, according to certain embodiments.
Figure 11N:
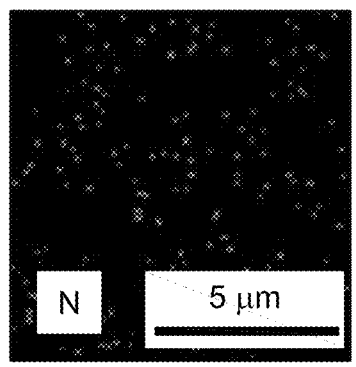
FIG. 11N depicts an EDX elemental mapping analysis image of the PPy/G-CN/HCPAM membrane showing a uniform distribution of nitrogen, according to certain embodiments.

The surface morphological features of the (PSf/PET), pristine HCPAM, and 0.10%-PPy@G-CN/HCPAM were determined by FESEM. The results are shown in FIGS. 9A-B, 9D-E, and 9G-H. The FESEM of PSf/PET ultrafiltration support is shown in FIG. 9A and FIG. 9B along with EDX analysis (FIG. 9C), where it can be seen that the PSf/PET support was intact and possessed uniformly distributed pore structure, while EDX analysis showed the presence of elements of PSf/PET support which included carbon (C), oxygen (O) and sulfur(S). In the case of the pristine membrane (HCPAM) (FIG. 9D and FIG. 9E), the formation of a polyamide active layer is visible in the form of globular structures covering the PSf/PET surface completely. FIG. 9F showed the presence of C, O, S, and an additional element, nitrogen (N), due to tetramine's contribution to the polyamide formation. In the case of 0.10%-PPy@G-CN/HCPAM membrane (FIGS. 9G and 9H), the surface of the membrane became even more globular and denser than HCPAM, which can be attributed to the contribution of PPy@G-CN in the crosslinking event of IP. The PPy@G-CN/HCPAM possessed a uniform ridge and valley structure similar to the commercial membranes (FIG. 9H). Furthermore, the active layer was devoid of any agglomeration of the nanocomposite which also hinted the uniform distribution of PPy@G-CN nanocomposite in the polyamide active layer. FIG. 9I showed the presence of C, O, S, and nitrogen (N) in the 0.10%-PPy@G-CN/HCPAM membrane. The high-resolution micrographs of pure HCPAM and PPy@G-CN/HCPAM membranes are given in FIG. 10A and FIG. 10B, respectively, where it was evident that the globular surface became relatively smooth after the inclusion of PPy@G-CN nanocomposite during membrane fabrication.

The elemental mapping analysis in FIG. 11 shows the distribution of various elements in the membrane. It can be seen that C, O, and S were uniformly distributed over the entire membrane surface as in the case of PSf/PET support (FIGS. 11A-11D). In the case of HCPAM, in addition to other elements, N is equally distributed over the entire membrane region (FIGS. 11E-11I). Similarly, in the case of PPy@G-CN/HCPAM, the N is uniformly distributed over the membrane (FIGS. 11J-11N). The presence and uniform distribution of all elements throughout the entire region of the fabricated membrane confirmed that all of the contributing components were present in the structure of the membrane.

Figure 12:
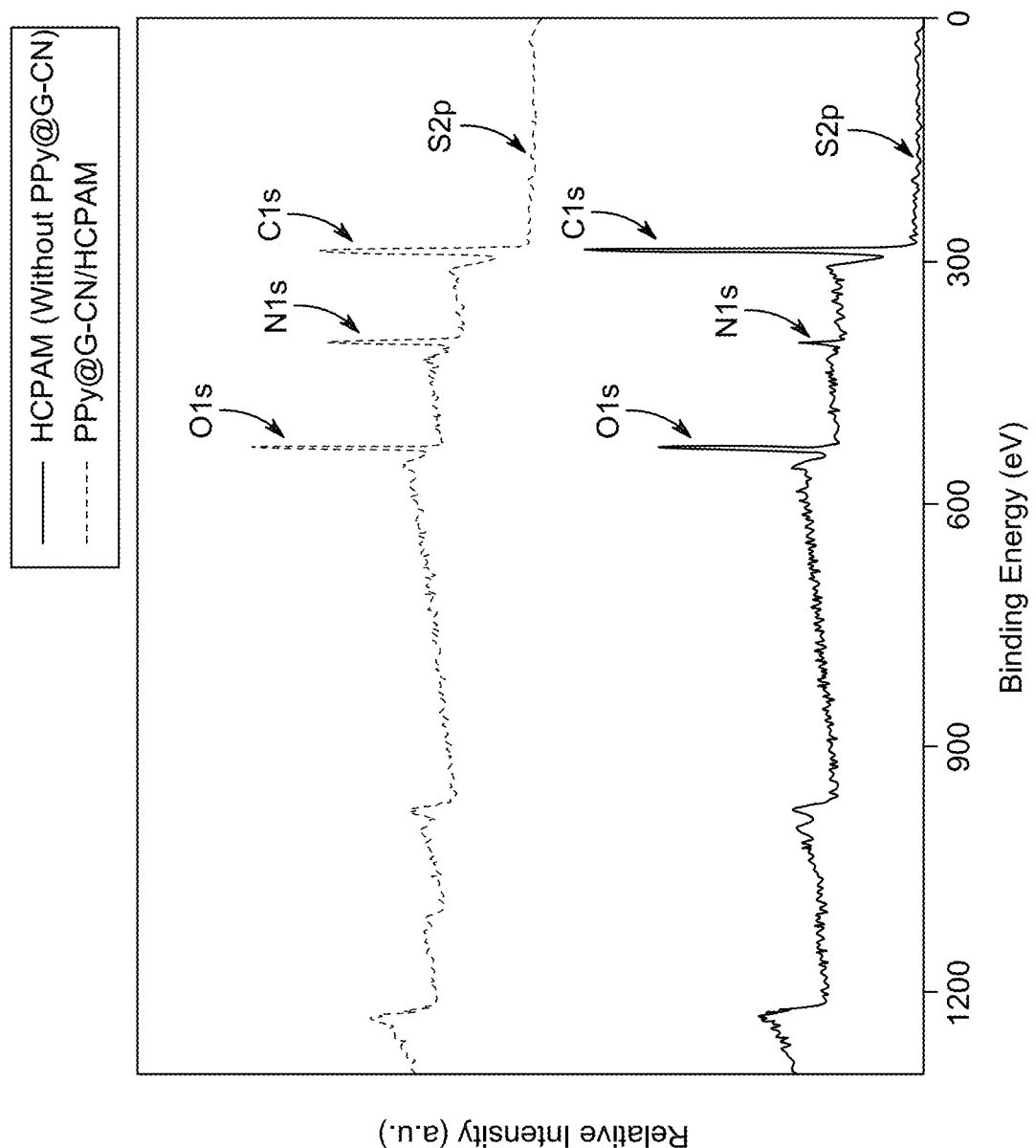
FIG. 12 depicts an X-ray photon spectroscopy (XPS) survey scan of the pristine HCPAM membrane and the PPy@G-CN/HCPAM membrane, according to certain embodiments.

To quantitatively establish the elemental composition of the membranes, XPS analysis was conducted as given in FIG. 12. The XPS analysis of pristine HCPAM revealed the presence of elements carbon (C1s), nitrogen (N1s), and oxygen (O1s) at 286.7 eV, 399.3 eV, and 530.4 eV, respectively, at their respective atomic ratios of 79.9%, 6.3%, and 13.8%. Although all of the elements C1s, N1s, and O1s were present in PPy@G-CN/HCPAM, their ratios were altered as C1s, N1s, and O1s were found at 71.0%, 15.5%, and 13.6% respectively. The higher percentage of N1s in the PPy@G-CN/HCPAM confirms the active contribution of PPy@G-CN nanocomposite in the membrane fabrication. Moreover, the N/C ratio of 7.8% and 21.7%, and O/C ratio of 17.2% and 19.0% were found for the HCPAM and the PPy@G-CN/HCPAM nanocomposite membranes. An increase in N/C and O/C ratios after the inclusion of PPy@G-CN indicated an increase in the degree of crosslinking during interfacial polymerization as both >C—O and C—N are constituents of amide (—CONH—) linkage.

The flux of DI water was measured at various transmembrane pressures where the transmembrane pressure was varied from 10 bar to 25 bar. It was observed that the flux of DI water was linearly related to the applied transmembrane pressure, which hinted at the integrity and stability of the membrane during crossflow filtration experiments. Among the various membranes tested, the 0.1%-PPy@G-CN/HCPAM showed higher performance in terms of flux compared to the pristine HCPAM, 0.05%, and 0.25% versions of PPy@G-CN/HCPAM. The 0.10%-PPy@G-CN/HCPAM had a flux of 78.57 L m$^{-2}$ h$^{-1}$ compared to pristine HCPAM with a water flux of 52.85 L m$^{-2}$ h$^{-1}$, 0.05%-PPy@G-CN/HCPAM with a flux of 55.71 L m$^{-2}$ h$^{-1}$, and 0.25%-PPy@G-CN/HCPAM with a DI water flux of 54.42 L m$^{-2}$ h$^{-1}$ at 25 bars. The trend of water flux by different membranes was explained by considering several factors, such as WCA and tightness/porosity of different membranes. Lower permeate flux by 0.05%-PPy@G-CN/HCPAM was defined by a large value of WCA of 88.21, which was linked with decreased hydrophilicity of membranes leading to lower permeate flux of 55.71 L m$^{-2}$ h$^{-1}$. The higher permeate flux (78.57 L m$^{-2}$ h$^{-1}$) shown by 0.10%-PPy@G-CN/HCPAM was due to the lowering of WCA compared to 0.05%-PPy@G-CN/HCPAM and porosity for passage of water molecules. Although 0.25%-PPy@G-CN/HCPAM showed the lowest WCA, the permeate flux was also low, indicating that pure water permeation is not merely dependent on WCA; instead, water permeation was dependent on other factors like membrane porosity and degree of cross-linking. As 0.25%-PPy@G-CN/HCPAM had the highest content of PPy@G-CN, which led to extensive crosslinking (as confirmed by XPS studies), leading to the tighter active layer with decreased porosity resulting in the lowest permeate flux of 54.42 L m$^{-2}$ h$^{-1}$. Therefore, 0.10% of PPy@G-CN nanocomposite dosage resulted in the highest in terms of pure water permeate flux and rejection of salts and pollutants.

Figure 13A:
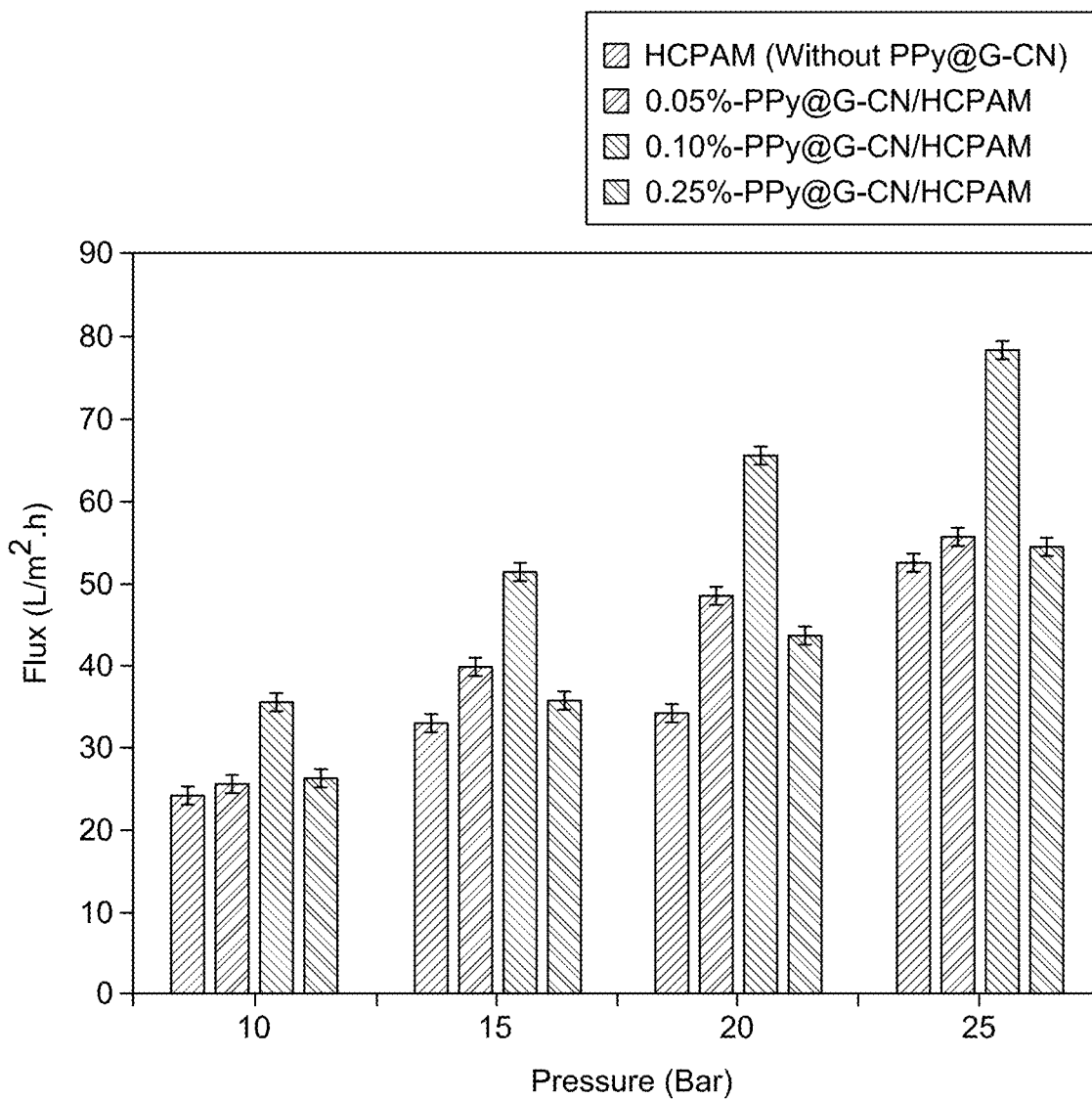
FIG. 13A depicts the deionized (DI) water flux performance of the pristine HCPAM membrane, and various PPy/G-CN/HCPAM membranes (each formed with different proportions of PPy in the PPy@G-CN composite), according to certain embodiments.
Figure 13B:
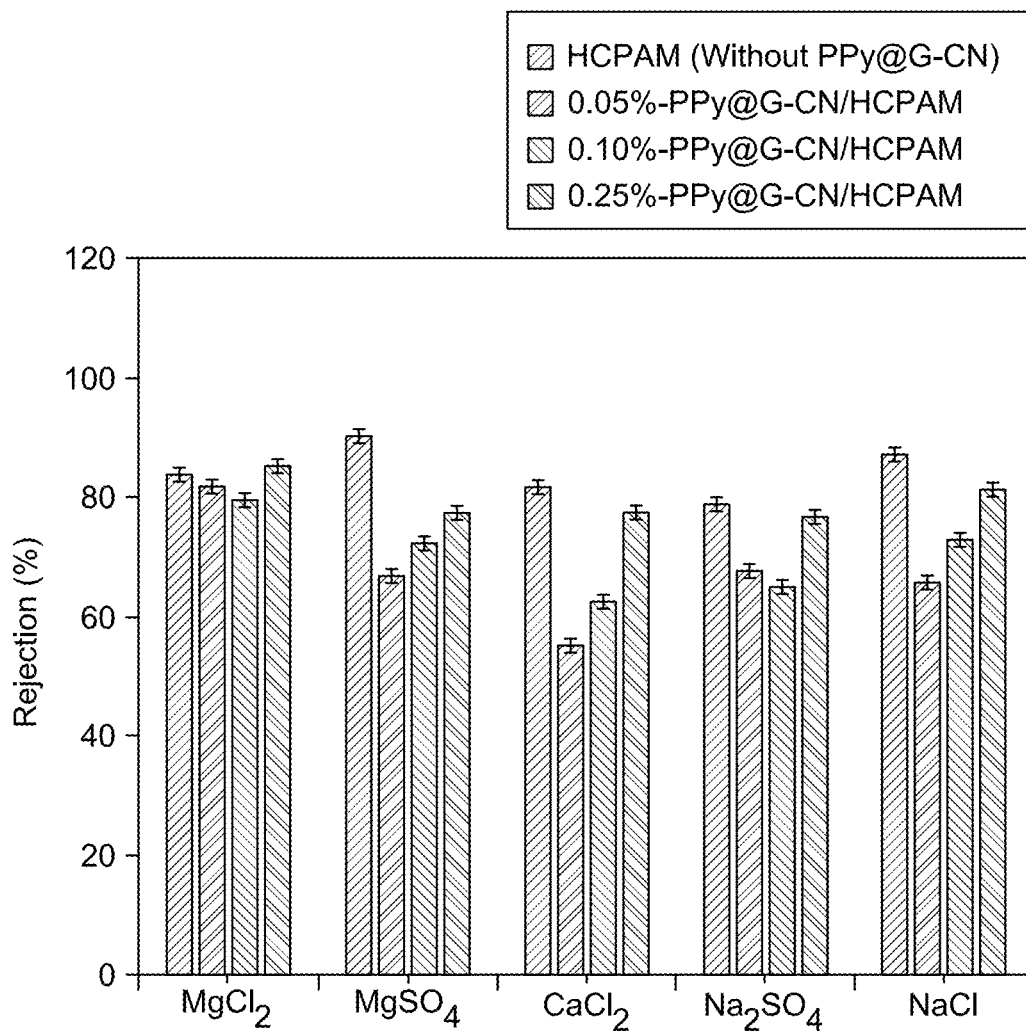
FIG. 13B depicts the percentage rejection of different tested salts with the pristine HCPAM membrane, and the PPy/G-CN/HCPAM membrane, at a pressure of 20 bars, according to certain embodiments.

However, the rejection shown by the pristine HCPAM membrane was more than that of the nanocomposite membranes in the case of all the tested salts, including MgCl$_2$, Na$_2$SO$_4$, MgSO$_4$, CaCl$_2$, and NaCl. This was attributed to the rigidity and intrinsic molecular porosity of G-CN sheets with a possible inclination of the sheets at different planes, accounting for the slightly higher passage of the salts through the nanocomposite membranes compared to pristine HCPAM. However, the rejections of the various nanocomposite versions of PPy@G-CN/HCPAM were still considerably high for all the salts. Different versions of PPy@G-CN/HCPAM showed varied behavior for different salts; for example, 0.10%-PPy@G-CN/HCPAM showed the highest rejection for MgSO$_4$, CaCl$_2$), and NaCl compared to 0.05%-PPy@G-CN/HCPAM and 0.25%-PPy@G-CN/HCPAM. The FIGS. 13A and 13B show the flux and % rejection behavior of all the tested membranes.

Figure 14A:
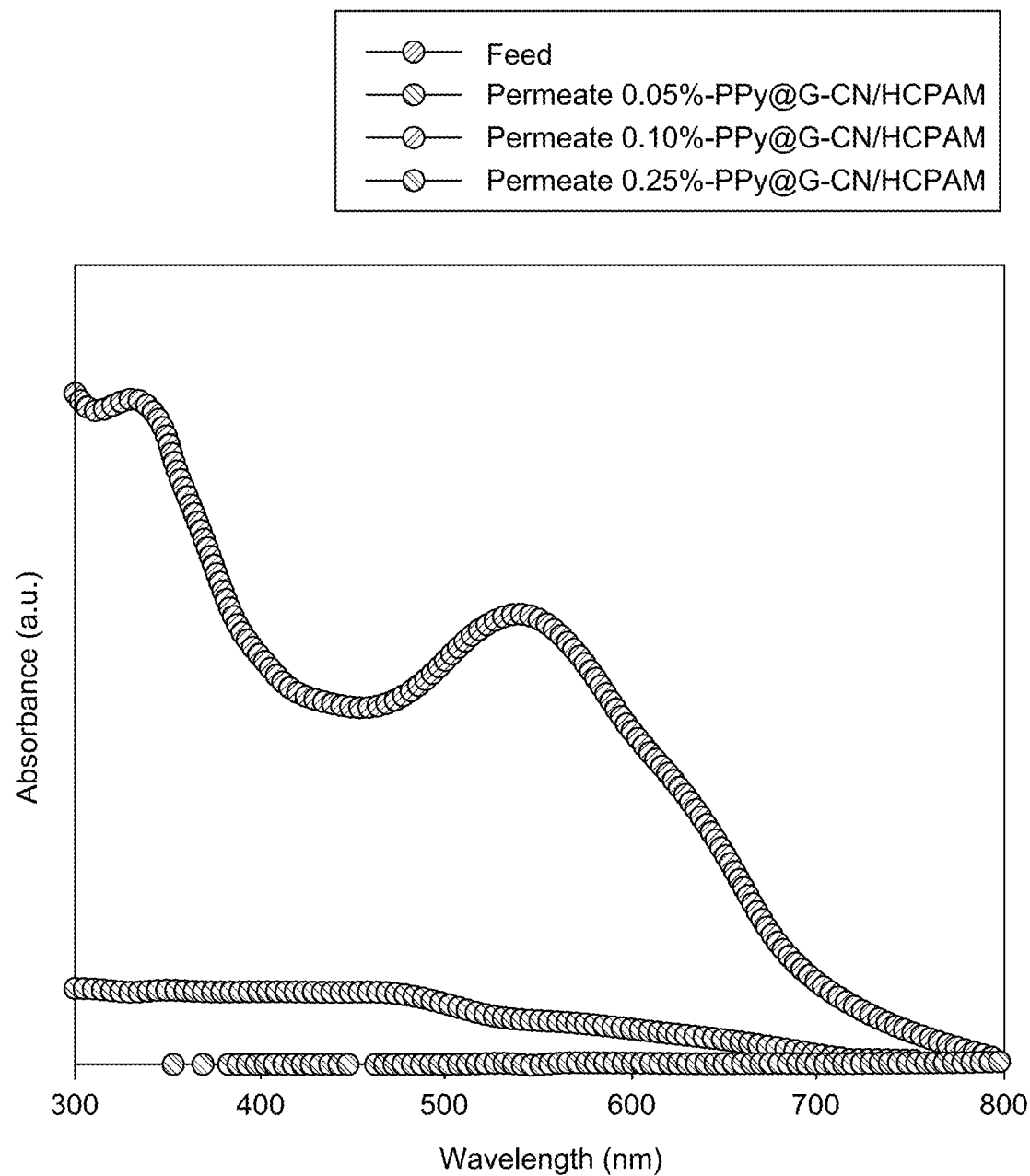
FIG. 14A is a UV-Visible plot of feed, and permeate obtained from the three different PPy/G-CN/HCPAM membranes (0.05%-PPy/G-CN/HCPAM, 0.1%-PPy/G-CN/HCPAM, and 0.25% PPy/G-CN/HCPAM), at a pressure of 20 bars, according to certain embodiments.
Figure 14B:
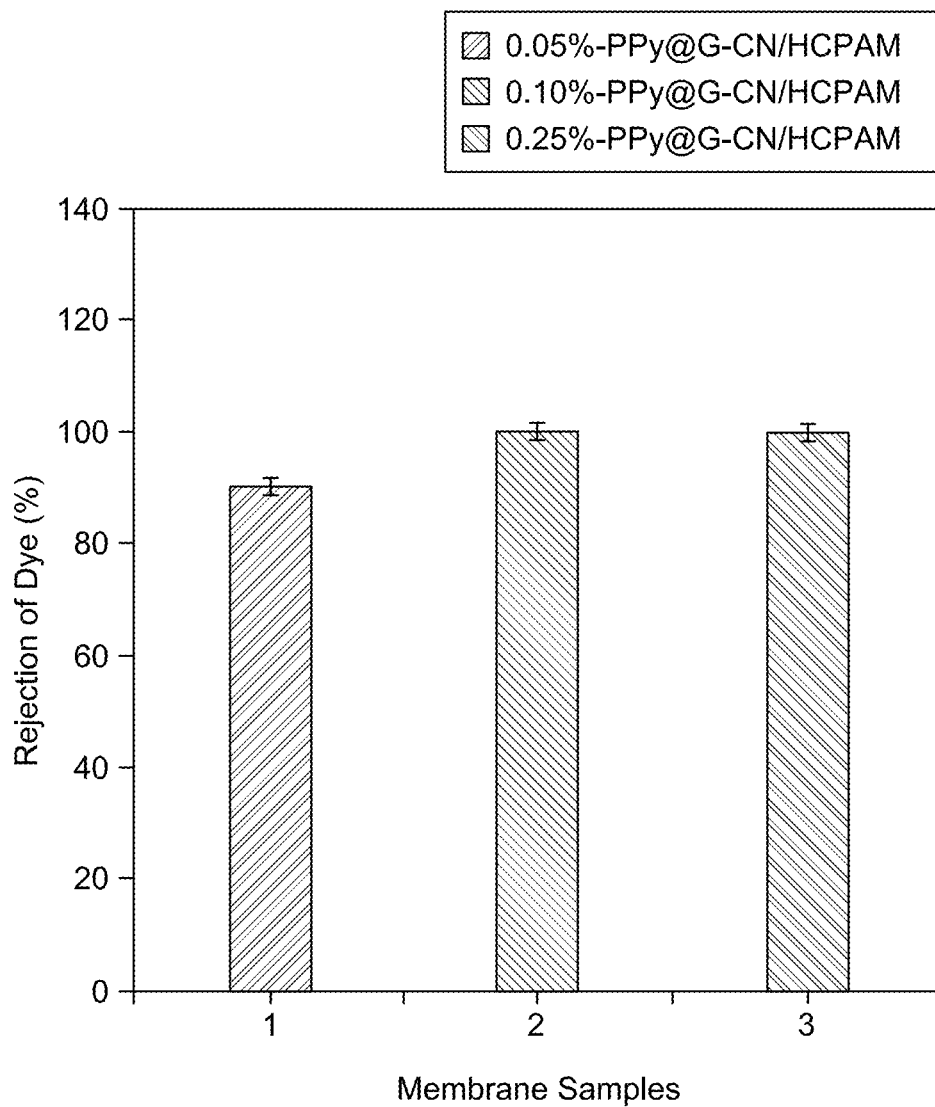
FIG. 14B depicts the percentage rejection of EBT from the three different PPy/G-CN/HCPAM membranes (0.05%-PPy/G-CN/HCPAM, 0.1%-PPy/G-CN/HCPAM, and 0.25% PPy/G-CN/HCPAM), at a pressure of 20 bars, according to certain embodiments.
Figure 14C:
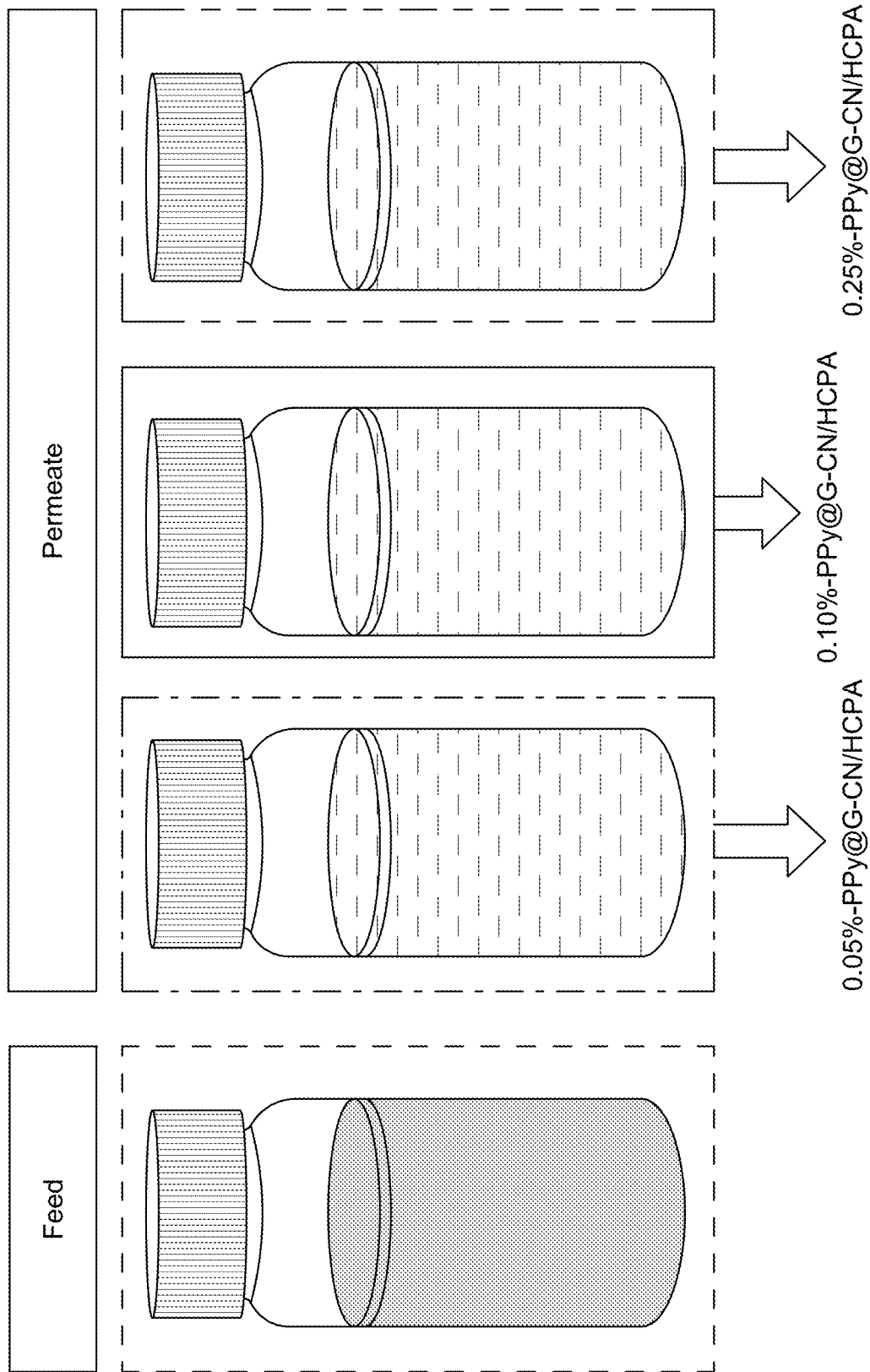
FIG. 14C is a digital photograph of feed, and permeate obtained from the three different PPy/G-CN/HCPAM membranes (0.05%-PPy/G-CN/HCPAM, 0.1%-PPy/G-CN/HCPAM, and 0.25% PPy/G-CN/HCPAM), at a pressure of 20 bars, according to certain embodiments.

To investigate the self-cleaning potential of PPy@G-CN/HCPAM, a feed solution of 10 mg g$^{-1}$ of EBT was applied to the membranes. The membrane was installed parallel to the crossflow filtration trolley. The EBT was deposited on the membrane for 2 h at 20 bars, and the permeate was collected for analysis. It was evident from FIG. 14A that the UV-Vis of the permeate obtained from three tested membranes showed no considerable absorbance at the $\lambda_{max}$ of 550 nm of EBT feed. Furthermore, FIG. 14B shows that all three membranes rejected the EBT with >90%, with rejection reaching 99.9% in the case of 0.10%-PPy@G-CN/HCPAM and 0.25%-PPy@G-CN/HCPAM. FIG. 14C is a digital photograph of feed and permeate obtained from the three versions of PPy/G-CN/HCPAM at 20 bars. From FIG. 14C, it can be observed that the permeate was transparent with all three tested membranes indicating the rejection of the EBT.

Figure 15:
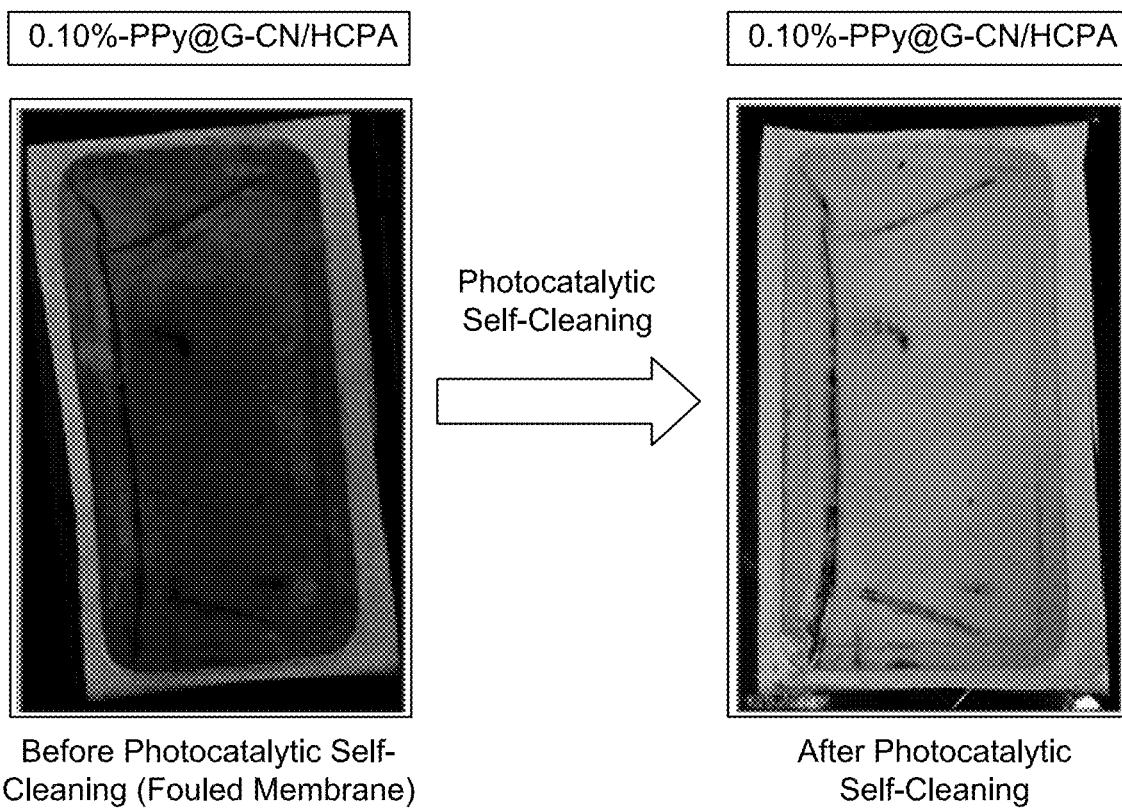
FIG. 15 depicts a photograph comparing the membranes before and after irradiation by the simulated solar light, according to certain embodiments.

The self-cleaning properties of the photoresponsive 0.10%-PPy/G-CN/HCPAM were evaluated by photocatalytic degradation of organic foulant (EBT dye) deposited on the membrane surface. The membrane was taken out of the crossflow filtration cell and then irradiated by simulated solar light for 1 h to monitor the degradation of the organic foulant adsorbed on the membrane surface. Given the excellent photocatalytic behavior of PPy/G-CN nanocomposite photocatalyst, the 0.10%-PPy/G-CN/HCPAM membrane showed exceptional self-cleaning behavior as all of the organic fouling (coloration) of the dye on the membrane surface was completely disappeared after solar light irradiation. Moreover, the 0.10%-PPy/G-CN/HCPAM membrane remained physically intact even after exposure to the simulated solar light as it is evident from FIG. 15. This was attributed to (1) the covalent cross-linking of the PPy/G-CN nanocomposite in the polyamide active layer through —N—H function of PPy which can easily attack acid chloride group of TPC in the presence of TEA and (2) the photocatalytic efficiency of the PPy/G-CN nanocomposite was good enough to completely degrade the dye from the surface of the membrane. Generally, the polymeric membranes are prone to UV irradiation as the polymers can degrade on exposure to UV light. However, in the present study, the UV light was not used solely for membrane irradiation; instead, a simulated solar light which was a mixture of UV and visible lights was used, thereby minimizing the impact/damage on the membranes. On the other hand, the fabricated membrane showed a stable performance even after repeated exposure to solar simulated light.

Figure 16:
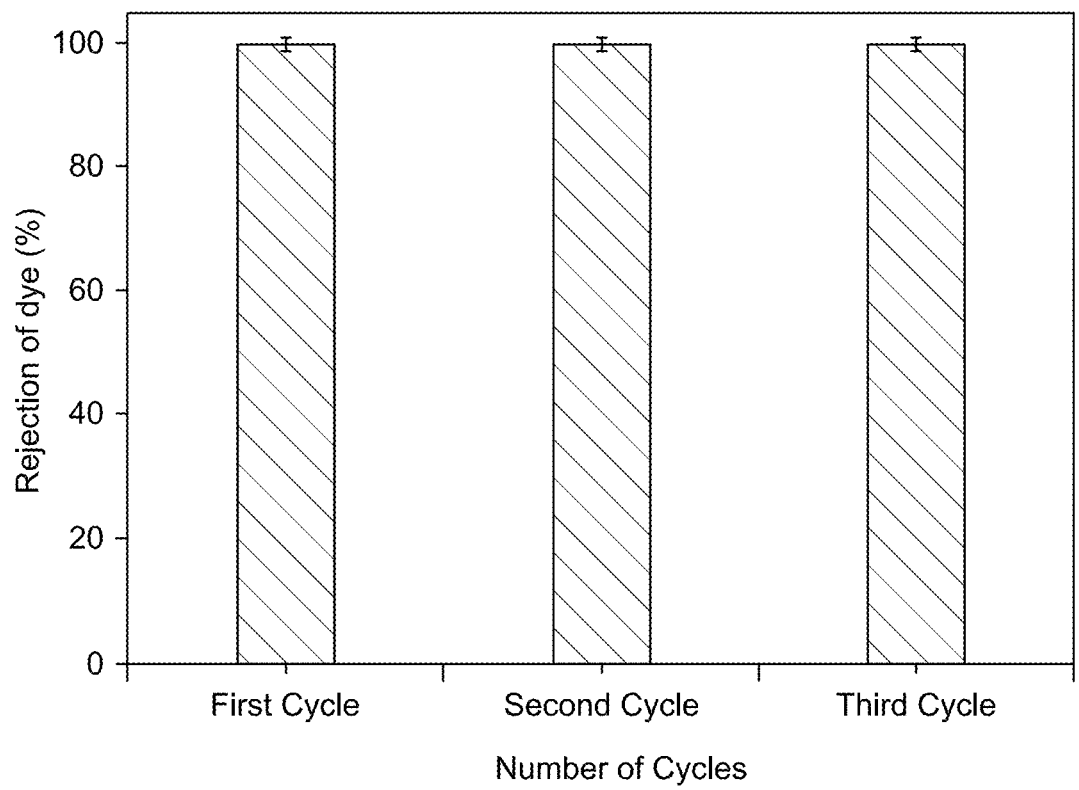
FIG. 16 is a plot depicting stability and recyclability of the PPy@G-CN/HCPAM membrane, after self-cleaning under the simulated solar light irradiation, according to certain embodiments.
Figure 17A:
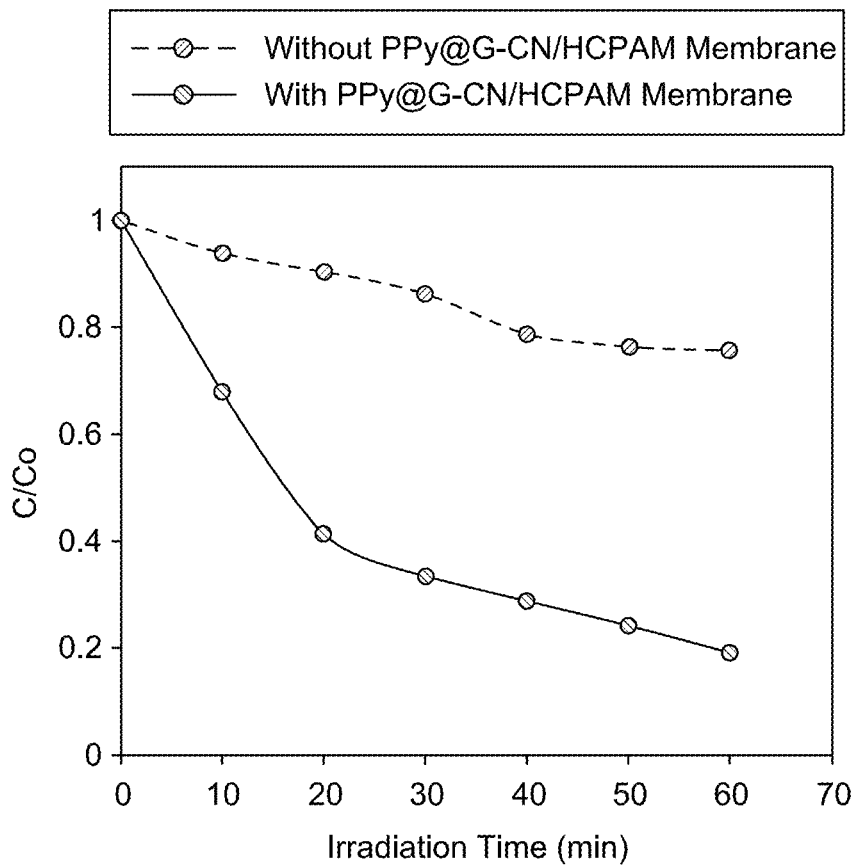
FIG. 17A is a decay curve depicting degradation of the EBT dye, with and without PPy@G-CN/HCPAM membrane, under the simulated solar light irradiation, according to certain embodiments.
Figure 17B:
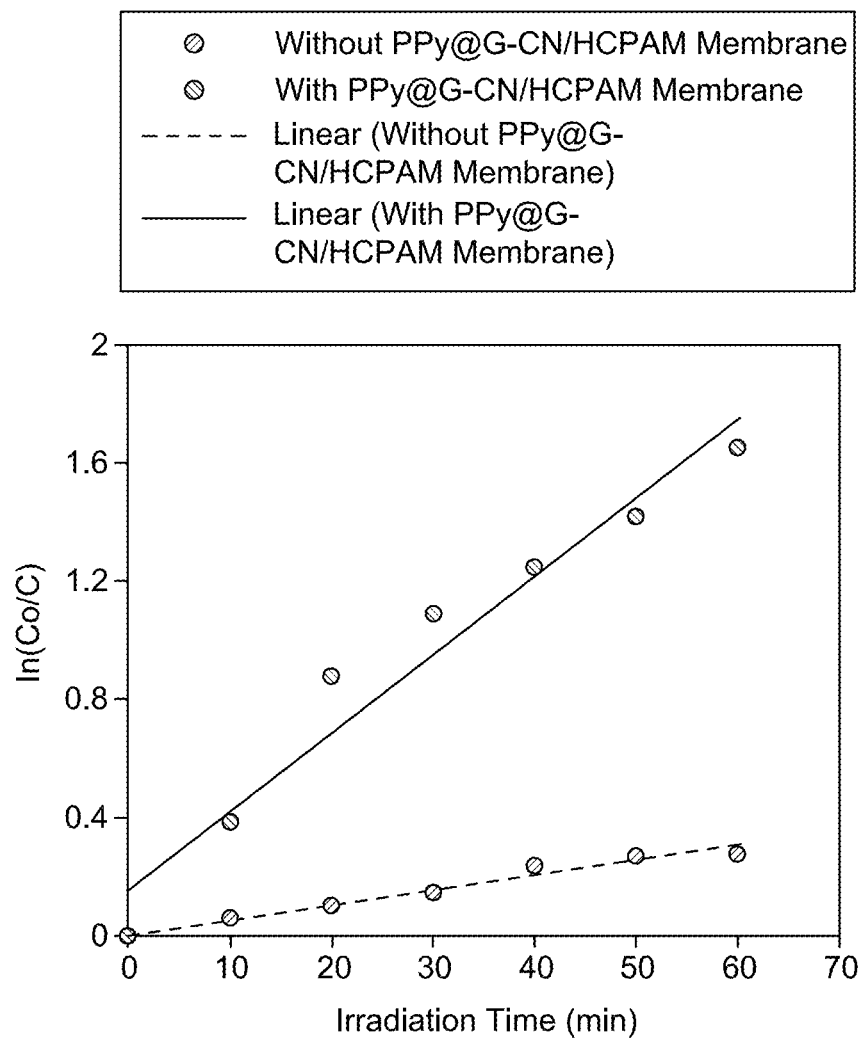
FIG. 17B is a linearized fitted curve depicting the degradation of the EBT dye, with and without PPy@G-CN/HCPAM membrane, under the simulated solar light irradiation, according to certain embodiments.
Figure 17C:
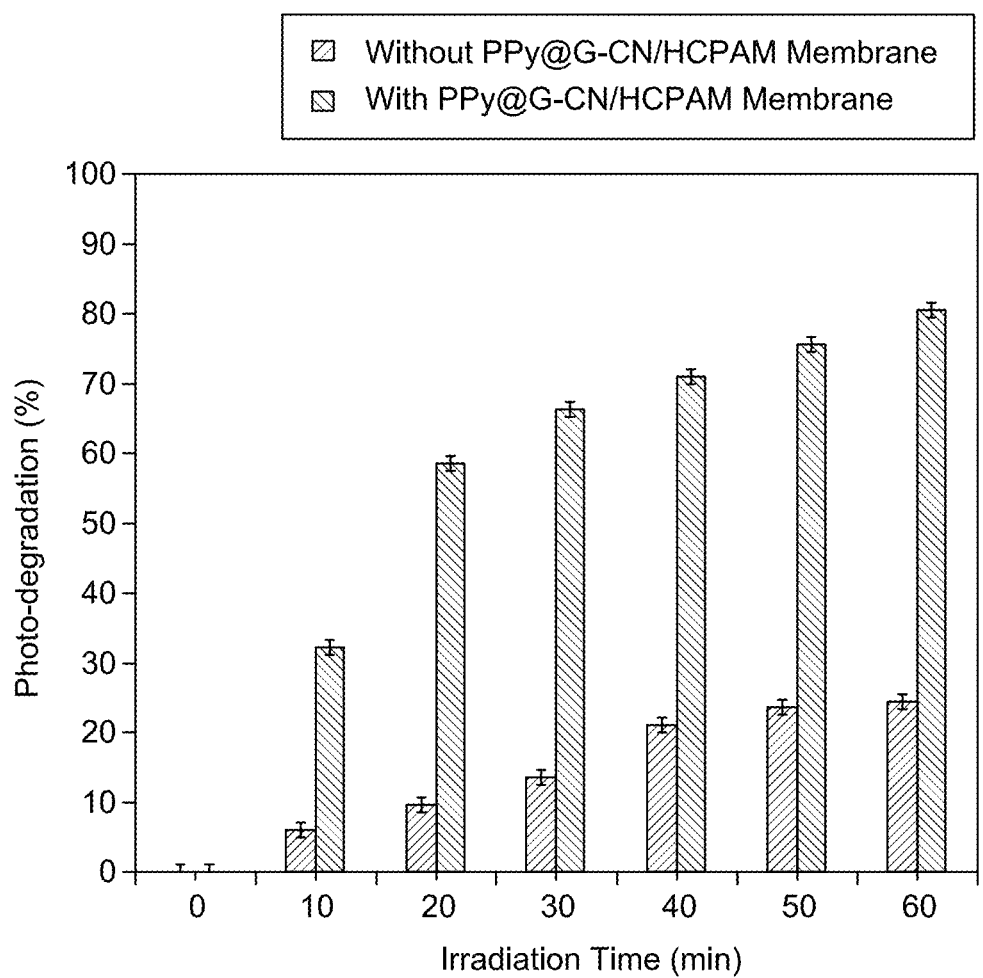
FIG. 17C depicts the percentage degradation of the EBT dye, with and without PPy@G-CN/HCPAM membrane, under the simulated solar light irradiation, according to certain embodiments.

The stability and recyclability of PPy@G-CN/HCPAM were studied by repeatedly applying EBT-contaminated feed for three consecutive cycles. Later, the PPy@G-CN/HCPAM membrane was self-cleaned after each cycle by exposure to solar-simulated light leading to self-cleaning of the membrane surface. The PPy@G-CN/HCPAM membrane retained its performance even after three cycles of EBT fouling and self-cleaning (FIG. 16). As EBT is a photosensitizer, a control experiment was also performed to determine the percentage of degradation of EBT dye with and without PPy@G-CN/HCPAM photocatalytic membrane under simulated solar light irradiation. As shown in FIGS. 17A-B, EBT decayed faster with the PPy@G-CN/HCPAM photocatalytic membrane compared to the pristine membrane. From FIG. 17C, it can be observed that EBT showed a photo-degradation of just 22% with the pristine membrane, while ~82% of EBT dye was photo-catalytically degraded under simulated solar light irradiation, after 1 hour, with the PPy@G-CN/HCPAM photocatalytic membrane.

Figure 18:
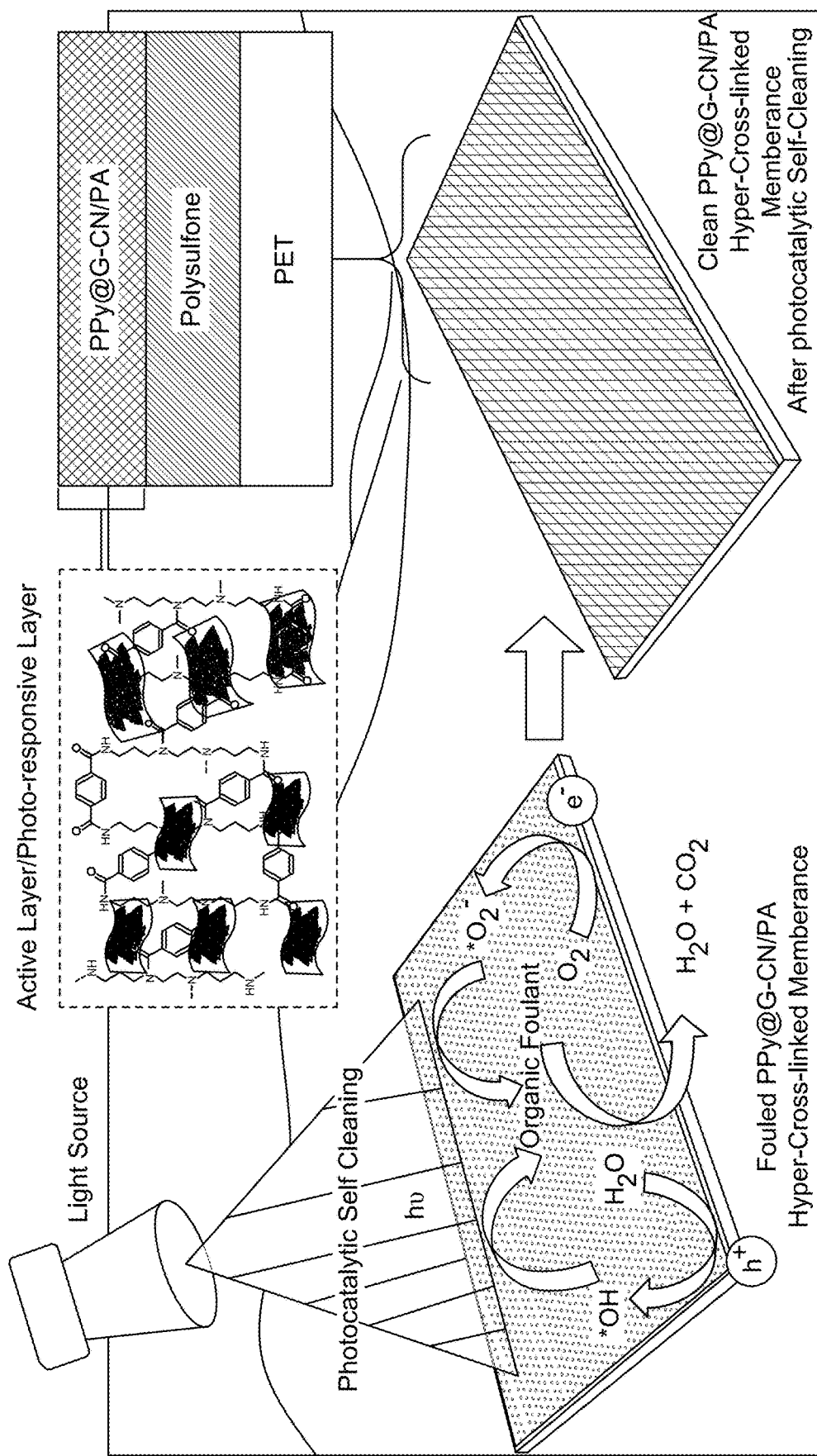
FIG. 18 is a schematic representation depicting a possible photocatalytic self-cleaning mechanism for degrading organic foulant (dye) under simulated solar light irradiation using PPy/G-CN/HCPAM, according to certain embodiments.

Generally, the working mechanism of photocatalytic degradation of the organic pollutants (especially the dyes) is based on the generation of reactive oxygen species (ROS including singlet oxygen), which involves a series of oxidation-reduction steps. A possible mechanism of photocatalytic degradation of dye under solar simulated light is given in the following FIG. 18. The highest occupied molecular orbital (HOMO) and lowest unoccupied molecular orbital (LUMO) of PPy possess +2.67 eV and −0.18 eV, while the conduction band (CB) and valance bands (VB) of G-CN lie at −1.12 eV and +1.57 eV, respectively. Under solar-simulated light irradiation, both PPy and G-CN get excited and generate $e^-$ and $h^+$. As the CB band of G-CN is more negative than the LUMO of PPy, some of the photo-generated $e^-$ are transferred from the CB of G-CN to the LUMO of PPy. At the same time, the $h^+$ generated in the PPy HOMO are transferred to G-CN, leading to the separation of electrons and holes, which results in their decreased tendency to recombine, which in turn leads to enhanced photocatalytic activity of the PPy@G-CN nanocomposite. The photo-generated $e^-$ could react with surface oxygen ($O_2$), producing superoxide radical $.O_2^-$ which in turn reacts with water and is transferred to hydroxyl radical, .OH. However, the h+ generated on G-CN cannot produce .OH on reaction with water as the energy of the VB of G-CN is lower than the standard redox potential of $OH/H_2O$ (+2.86 eV vs. SHE). Hence, the $h^+$ generated on G-CN reacts with the dye molecule leading to the degradation of the dyes on the membrane surface.

Numerous modifications and variations of the present disclosure are possible in light of the above teachings. It is, therefore, to be understood that within the scope of the appended claims, the invention may be practiced otherwise than as specifically described herein.

The invention claimed is:

1. A method for cleaning a fouled water purification membrane, comprising:
   irradiating the fouled water purification membrane with light having a wavelength of 400-700 nm to chemically degrade a pollutant present on the fouled water purification membrane and thereby form a photocatalytically active membrane;
   wherein the photocatalytically active membrane comprises a polysulfone/polyethylene terephthalate (PSf/PET) support; and
   an active layer on an outer surface of the PSf/PET support, wherein the active layer comprises reacted units of:
   a diacyl chloride compound;
   a tetra-amine compound; and
   a nanocomposite comprising a mixture of graphitic carbon nitride in the form of nanosheets and having triazine and heptazine rings and polypyrrole,
   wherein the photocatalytically active membrane has pores with an average diameter of less than 1 nm.

2. The method of claim 1, wherein the graphitic carbon nitride is bonded to at least one terminal end of the polypyrrole in the nanocomposite.

3. The method of claim 1, wherein the nanosheets have a thickness of 10-100 nm.

4. The method of claim 1, wherein the diacyl chloride compound is an aromatic ring substituted with two acyl chloride groups.

5. The method of claim 1, wherein the tetra-amine compound is a linear or branched aliphatic amine with of 2-50 carbons and four amine groups.

6. The method of claim 1, wherein the photocatalytically active membrane has 0.01 to 5 wt % of the nanocomposite based on the total weight of the active layer.

7. The method of claim 1, wherein particles of the active layer have a globular shape.

8. The method of claim 1, wherein particles of the active layer are not agglomerated.

9. The method of claim 1, wherein particles of the active layer have an average size of 50-200 nm.

10. The method of claim 1, wherein the photocatalytically active membrane comprises 50-70 at. % carbon, 25-35 at. % sulfur, 5-15 at. % oxygen, and 1-10 at. % nitrogen, based on a total number of atoms in the photocatalytically active membrane.

11. The method of claim 1, wherein the photocatalytically active membrane has a surface roughness of less than 24 nm.

12. The method of claim 1, wherein the photocatalytically active membrane has a water contact angle of less than 90°.

13. The method of claim 1, wherein the active photocatalytically active membrane covers at least 95% of the outer surface of the polysulfone/polyethylene terephthalate (PSf/PET) support.

14. The method of claim 1, wherein the photocatalytically active membrane has a permeate flux of 40 to 100 L $m^{-2}h^{-1}$ at 10-30 bar.

15. The method of claim 1, wherein the photocatalytically active membrane rejects at least 60% of inorganic salts.

16. The method of claim 1, wherein the photocatalytically active membrane is self-cleaning following exposure to the light .

* * * * *